United States Patent
Feng et al.

(10) Patent No.: US 11,490,000 B2
(45) Date of Patent: Nov. 1, 2022

(54) DEPTH-ASSISTED AUTO FOCUS

(71) Applicant: QUALCOMM Incorporated, San Diego, CA (US)

(72) Inventors: Wen-Chun Feng, New Taipei (TW); Hui Shan Kao, New Taipei (TW); Hsuan-Ming Liu, New Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/203,235

(22) Filed: Mar. 16, 2021

(65) Prior Publication Data

US 2022/0116545 A1 Apr. 14, 2022

Related U.S. Application Data

(60) Provisional application No. 63/090,977, filed on Oct. 13, 2020.

(51) Int. Cl.
*H04N 5/232* (2006.01)
*G03B 13/32* (2021.01)
*H04N 5/369* (2011.01)

(52) U.S. Cl.
CPC ....... *H04N 5/232125* (2018.08); *G03B 13/32* (2013.01); *H04N 5/23229* (2013.01); *H04N 5/232122* (2018.08); *H04N 5/36961* (2018.08); *H04N 5/36965* (2018.08)

(58) Field of Classification Search
CPC ....... H04N 5/232125; H04N 5/232122; H04N 5/23229; H04N 5/36961; H04N 5/36965; G03B 13/32
See application file for complete search history.

(56) References Cited

U.S. PATENT DOCUMENTS

| 8,755,573 | B2 | 6/2014 | Ren et al. |
| 9,638,984 | B2 | 5/2017 | Lou et al. |
| 9,648,223 | B2 | 5/2017 | Honkanen |
| 10,547,779 | B2 | 1/2020 | Wan et al. |
| 2008/0267601 | A1* | 10/2008 | Kobayashi ......... H04N 5/23293 348/E5.042 |
| 2009/0115882 | A1* | 5/2009 | Kawarada ......... H04N 5/232122 348/340 |
| 2015/0323760 | A1* | 11/2015 | Tomosada ......... H04N 5/232122 250/201.2 |

(Continued)

*Primary Examiner* — Lin Ye
*Assistant Examiner* — John H Morehead, III
(74) *Attorney, Agent, or Firm* — QUALCOMM Incorporated

(57) ABSTRACT

An apparatus configured for image processing comprises one or more processors configured to determine data associated with a distance between an object and the apparatus and determine a plurality of lens positions of a camera lens based on the data associated with the distance between the object and the apparatus. The one or more processors are further configured to determine, for each one of the plurality of lens positions, a respective focus value to generate a plurality of focus values. To determine, for each one of the plurality of lens positions, the respective focus value, the one or more processors are configured to determine, for each one of the plurality of lens positions, phase difference information. The one or more processors are further configured to determine a final lens position based on the plurality of focus values.

27 Claims, 16 Drawing Sheets

(56) References Cited

U.S. PATENT DOCUMENTS

| | | | |
|---|---|---|---|
| 2016/0266467 A1* | 9/2016 | Lou | G03B 3/10 |
| 2017/0017136 A1* | 1/2017 | Kao | H04N 13/239 |
| 2017/0230649 A1* | 8/2017 | Galor Gluskin | H04N 17/002 |
| 2018/0349378 A1* | 12/2018 | Galor Gluskin | H04N 5/232122 |
| 2019/0335089 A1* | 10/2019 | Kadambala | G06V 10/764 |
| 2020/0271765 A1 | 8/2020 | Glover et al. | |

* cited by examiner

DEPTH-ASSISTED AUTO FOCUS

PRIORITY CLAIM

This application claims the benefit of U.S. Provisional Patent Application No. 63/090,977, filed 13 Oct. 2020, the entire contents of which is incorporated herein by reference.

TECHNICAL FIELD

This disclosure relates generally to systems and methods for image capture devices, and specifically to depth-assisted autofocus.

BACKGROUND

Digital cameras use a camera lens to focus incoming light onto a camera sensor for capturing digital images. The camera lens has a focal length that places a range of depth of the scene in focus. Portions of the scene closer or further than the range of depth may be out of focus, and therefore appear blurry in a resulting image. The distance of the camera lens from the camera sensor indicates the distance of the range of depth for the scene from the camera lens that is in focus. Many devices are capable of moving the camera lens to adjust the distance between the camera lens and the camera sensor, thereby adjusting which portions of a scene appear in focus for captured images.

A device may attempt to determine the position of the camera lens to place a portion of interest of the scene in focus. For example, the device may automatically determine a portion of the scene to be in focus (such as the center of a camera's field of view). In response, the device may perform autofocus (AF) operations to automatically adjust the camera lens position so that the portion of the scene is in focus for subsequent image captures.

SUMMARY

In general, this disclosure describes techniques for performing an automatic focus (e.g., "autofocus" or "AF") operation to adjust a camera lens position. This disclosure further describes techniques for using active-depth assisted techniques (e.g., laser autofocus, time-of-flight, etc.) together with image-based focus techniques for determining the lens position of a camera. In some examples, the techniques of this disclosure may reduce a time to determine a focus point of an autofocus operation, which may potentially reduce a processing burden on the camera processor and/or reduce a power consumption of the camera processor. Moreover, reducing a time to determine a focus point of an autofocus operation may improve a user experience. Additionally, in some examples, the techniques of this disclosure may reduce a time to determine a focus point of an autofocus operation in low light conditions.

In one example, an apparatus is configured for image processing. The apparatus comprises one or more processors configured to determine data associated with a distance between an object and the apparatus and determine a plurality of lens positions of a camera lens based on the data associated with the distance between the object and the apparatus. The one or more processors are further configured to determine, for each one of the plurality of lens positions, a respective focus value to generate a plurality of focus values. To determine, for each one of the plurality of lens positions, the respective focus value, the one or more processors are configured to determine, for each one of the plurality of lens positions, phase difference information. The one or more processors are further configured to determine a final lens position based on the plurality of focus values.

In another example, a method for image processing includes determining, with one or more processors implemented in circuitry, data associated with a distance between an object and a camera lens and determining, with the one or more processors, a plurality of lens positions of the camera lens based on the data associated with the distance between the object and the camera lens. The method further includes determining, with the one or more processors and for each one of the plurality of lens positions, a respective focus value to generate a plurality of focus values. Determining, for each one of the plurality of lens positions, the respective focus value comprises determining, for each one of the plurality of lens positions, phase difference information. The method further includes determining, with the one or more processors, a final lens position based on the plurality of focus values.

In one example, a device for image processing, the device comprises means for determining data associated with a distance between an object and the device and means for determining a plurality of lens positions of a camera lens based on the data associated with the distance between the object and the device. The device further comprises means for determining, for each one of the plurality of lens positions, a respective focus value to generate a plurality of focus values. The means for determining, for each one of the plurality of lens positions, the respective focus value comprises means for determining, for each one of the plurality of lens positions, phase difference information. The device further comprises means for determining a final lens position based on the plurality of focus values.

In another example, a computer-readable storage medium having stored thereon instructions that, when executed, configure one or more processors to determine data associated with a distance between an object and a camera lens and determine a plurality of lens positions of the camera lens based on the data associated with the distance between the object and the camera lens. The instructions further cause the one or more processors to determine, for each one of the plurality of lens positions, a respective focus value to generate a plurality of focus values. The instructions that cause the one or more processors to determine, for each one of the plurality of lens positions, the respective focus value further cause the processor to determine, for each one of the plurality of lens positions, phase difference information. The instructions further cause the one or more processors to determine a final lens position based on the plurality of focus values.

The details of one or more examples are set forth in the accompanying drawings and the description below. Other features, objects, and advantages will be apparent from the description, drawings, and claims.

DETAILED DESCRIPTION

Figure 1:
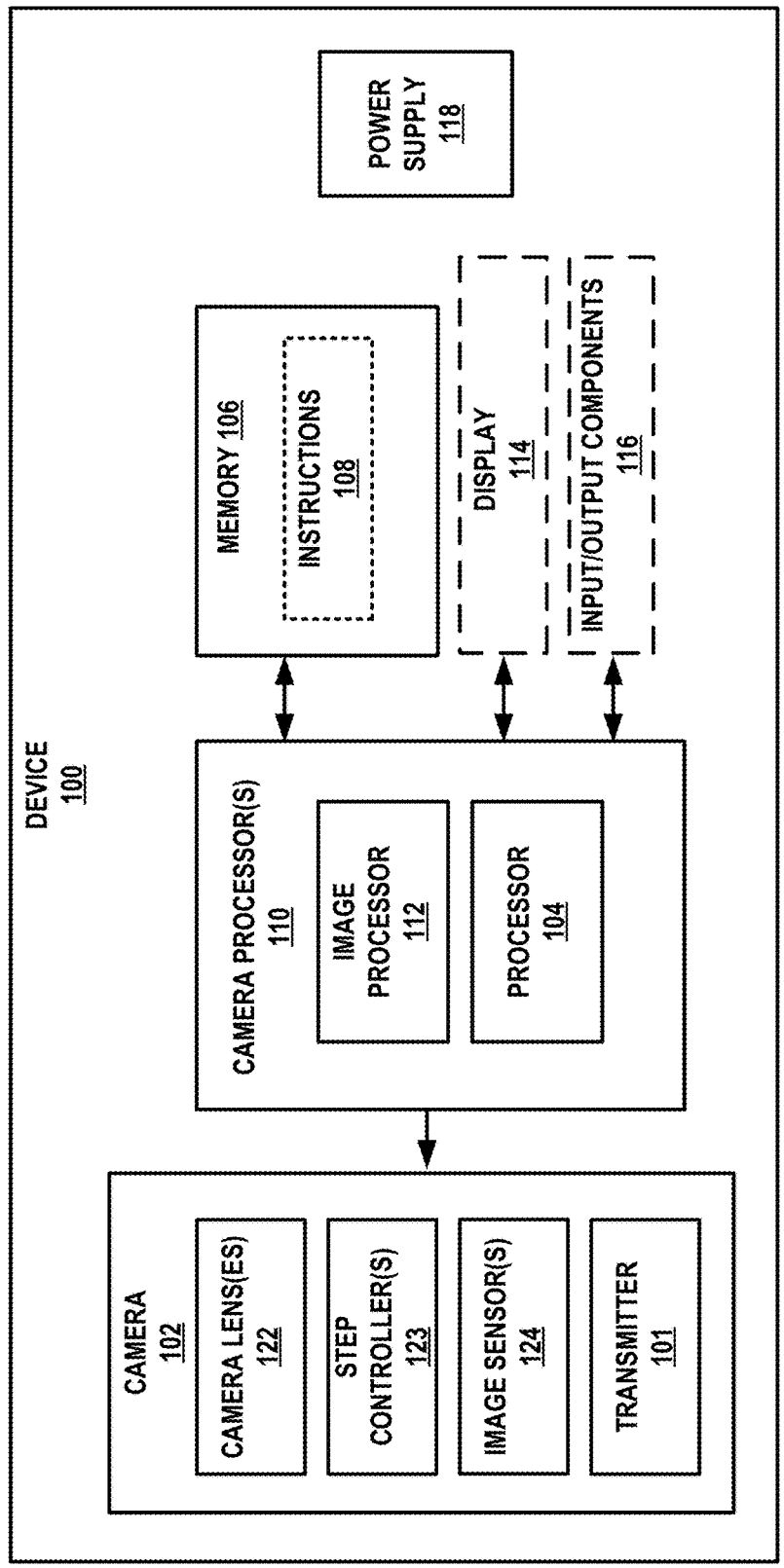
FIG. 1 is a block diagram of an example device for performing AF, in accordance with the techniques of the disclosure.

During an autofocus (AF) operation for a camera, a position of a camera's lens with reference to the camera's image sensor may be adjusted to place a portion of the scene in focus for the camera. For example, an AF operation may be performed to move the camera lens in order to place one or more objects in a region of interest (ROI) of a scene in focus (e.g., the portion of the scene received by a center of the image sensor is in focus in resulting images). An AF operation may be triggered if a camera is being initialized or if a scene has changed. Scene change examples include the camera moving (which may be referred to herein as global motion) or objects in the scene moving (which may be referred to herein as local motion). Examples of global motion include a user rotating the camera, shaking the camera, or the camera otherwise moving during operation. Examples of local motion include a person walking in front of the camera, people, cars, or other objects in the scene moving during frame capture, a user's finger covering a portion of the camera lens or camera aperture to the image sensor, or other changes to the scene during camera operation.

An example AF operation may comprise contrast detection (CD) autofocus (CDAF or contrast detection AF). For CDAF, a frame may be received by the camera's image sensor, and a contrast may be determined for a portion of the scene from the frame. The camera lens position is adjusted until a suitable contrast associated with the camera lens position is identified. The contrast is a difference in measured light intensity (e.g., luminance) between neighboring pixels of the image sensor. For a region of an image that is not in focus (which may be referred to as out-of-focus), contrast values overall may be negligible or below a threshold as the light intensity may be similar for neighboring pixels. For example, there exists less variation in light intensity between pixels when a portion of an image is blurry (e.g., out-of-focus) than when the portion of the image is clear (e.g., in-focus). A suitable contrast (which may be associated with a specific lens position) may be greater than a threshold contrast or may be greater than contrasts associated with neighboring lens positions. For example, the camera lens may be moved to a focus position associated with a largest contrast for a region of interest (ROI) in the scene (which may be referred to as a peak contrast).

Another example AF operation comprises an active-depth assisted focus operation (e.g., laser autofocus, time-of-flight, etc.). In some examples, an active-depth assisted operation may include the transmittance of near-infrared/infrared electromagnetic (NIR/IR EM) spectrum. An active-depth assisted operation may include a time-of-flight (ToF) calculation.

For example, one or more sensors (e.g., laser sensors) can return data associated with the distance between an object and a device and/or camera lens, such as for instance, a physical distance for every frame. In some examples, the distance is measured on the magnitude of millimeters. In another example, the distance is determined based on a ToF calculation, e.g., the time difference between emitting light and detecting returned or reflected light.

At the start of a monitor phase, a device (e.g., an imaging device) may determine data associated with the distance between an object and the device and/or camera lens of the device. For example, the device may determine the distance between the device and a scene of a referential frame is determined, and when the difference between the distances detected between a subsequent frame and the referential frame is greater than some threshold, a scene change is detected. For example, similar to the luma value and movement based determinations, a threshold can be set to 100 mm. At the first frame of the monitor phase the distance of the object may be determined to be 200 mm from the imaging device, and then at some subsequent frame the distance from the imaging device to the object is determined to be 600 mm. Thus, the difference in the distances of the referential and subsequent frame is greater than the threshold, and the imaging device is configured to determine that the scene has changed. While the preceding example included a threshold set to 100 mm, any threshold value may be selected based on the desired sensitivity of the scene change determination.

An example of another AF operation includes phase detection auto focus (PDAF). In some examples, an image sensor configured for PDAF may include dual photodiode pixels. Such image sensors may be referred to as dual PDAF sensors or dual photodiode (2PD) sensors. In some example dual PDAF sensors, two streams of data may be sent to a camera processor. One stream includes the pixel data to be processed when capturing a still image or video. The other stream includes phase difference pixel data used in a phase detection auto focus process.

In accordance with the techniques of the disclosure, an autofocus technique is described herein that uses an active-depth assisted focus (e.g., laser AF, ToF, etc.) along with an image-based focus refinement. Moreover, techniques described herein may perform image-based focus refinement using contrast difference information and/or a phase difference information from images acquired at the same time as the ToF measurements. The contrast information and/or phase difference information may be used to determine whether or not further fine search techniques are needed, which may reduce or eliminate a fine search process relative to other laser autofocus techniques. In this way, a device may be configured to perform autofocus at a faster speed and accuracy compared to systems that rely on an active-depth assisted focus (e.g., laser AF, ToF, etc.) and further fine search refinement, CDAF, or PDAF.

FIG. 1 is a block diagram of an example device 100 configured to perform an adjustable AF operation. Device 100 may include camera 102, one or more camera processors 110 (also referred to herein as simply "one or more processors 110"), and a memory 106 storing instructions 108. One or more processors 110 may include, for example, an image processor 112 and a processor 104. In some examples, device 100 may include (or be coupled to) a display 114 and/or a number of input/output (I/O) components 116. Device 100 may also include a power supply 118, which may be coupled to or integrated into device 100. Device 100 may include additional features or components not shown. For example, a wireless interface, which may include a number of transceivers and a baseband processor, may be included for a wireless communication device. In another example, device 100 may include or be coupled to additional cameras other than camera 102.

Camera 102 may be capable of capturing individual image frames (e.g., still images) and/or capturing video (e.g., a succession of received image frames). Camera 102 may include one or more camera lenses 122 (also referred to herein as simply "camera lens 122") and one or more image sensors 124 (also referred to herein as simply "image sensors 124"). Image sensor 124 may include processing circuitry, an array of pixel sensors (e.g., pixels) for capturing representations of light, memory, such as buffer memory or on-chip sensor memory, etc. Each one of one or more image sensors 124 may be coupled with a different one of one or more camera lenses 122, each lens and image sensor combination having different apertures and/or fields-of-view. Example lenses may include a telephoto lens, a wide angle lens, an ultra-wide angle lens, or other lens types.

One or more step controllers 123 (also referred to herein as simply "step controller 123") may move camera lens 122 to adjust a focal length for image sensor 124. During AF, one or more processors 110 may be configured to control movement of camera lens 122 to a final lens position and/or focus position (e.g., by causing an actuator to move camera lens 122). For example, device 100 may control a voice-coil motor (VCM) to move camera lens 122 to a determined focus position.

Transmitter 101 may be configured to transmit a signal for active depth sensing. Transmitter 101 may transmit pulsed light or a modulated light signal at a defined frequency for time-of-flight (ToF) depth sensing. In this manner, transmitter 101 may be referred to as being part of a time-of-flight (ToF) system. Image sensor 124 may be configured to receive reflections of the light for ToF depth sensing. For example, transmitter 101 may transmit a signal and image sensor 124 may receive a reflection of the signal. In this example, one or more processors 110 may determine a round trip time or a phase difference (PD) between the transmitted signal and the received signal. One or more processors 110 may associate the round trip time or phase difference with a depth of an object based on the speed of the signal (e.g., the speed of light for a light signal).

The transmitted signal may be light. The transmitted light may be in any suitable spectrum, such as the visible light spectrum or outside the visible light spectrum. For example, the transmitted light may be infrared (IR) light. As used herein, IR light may refer to light in the visible light spectrum (such as close to the red color light spectrum) or IR light outside the visible light spectrum (which may include shortwave IR (SWIR) light, near-field IR (NIR) light, far-field IR (FIR) light, and so on). The light may include ultraviolet light. The signal may include a frequency outside the light spectrum, such as a radio signal, sound signal, and so on. Image sensor 124 may be configured to receive such signals outside the light spectrum. For example, for radio signals, image sensor 124 may include a radio receiver. Therefore, while the examples describe active depth sensing using transmitted light, the present disclosure is not limited to a ToF system using light. Additionally, while ToF depth sensing is described as an example active depth sensing, any suitable active depth sensing system may be used. For example, a structured light depth sensing system, sound detection and ranging (SONAR), light detection and ranging (LIDAR), radio detection and ranging (RADAR), or any other suitable active depth sensing system may be used.

One or more processors 110 may be configured to control camera 102 and control an active depth sensing system (such as transmitter 101). One or more processors 110 may include a processor 104 and an image processor 112. Processor 104 may be one or more suitable processors capable of executing scripts or instructions of one or more software programs (such as instructions 108) stored within memory 106. In some aspects, processor 104 may be one or more general purpose processors that execute instructions 108 to cause device 100 to perform any number of functions or operations. In additional or alternative aspects, processor 104 may include integrated circuits or other hardware to perform functions or operations without the use of software.

Image processor 112 may be configured to process received image frames or video provided by camera 102. Image processor 112 may execute instructions from a memory (such as instructions 108 from memory 106 or instructions stored in a separate memory coupled to image processor 112). Image processor 112 may include specific hardware. Image processor 112 may alternatively or additionally include a combination of specific hardware and the ability to execute software instructions.

Image processor 112 may determine information associated with a depth of an object based on active depth sensing (e.g., using an RTT and/or a phase difference between transmitted light and received light). As noted above, while ToF depth sensing is described, other implementations of depth sensing may be used. For example, image processor 112 may perform depth sensing using structured light (which may include a known distribution of light transmitted, received, and compared to determine one or more depths of objects). In another example, transmitter 101 may provide a flood illumination, and intensities of the received reflections of the flood illumination may be used to determine one or more depths of objects. Transmitter 101 may also be referred to as a "projector" or an "emitter," and is not limited to a specific transmission component. Image sensor 124 may be referred to as a "detector," "sensor," "sensing element," or "photodetector," and is not limited to a specific receiving component. While examples described herein may describe image processor 112 as processing information from camera 102, in some examples, image processor 112 may be omitted and processor 104 may instead perform the steps performed by image processor 112.

Memory 106 may be a non-transient or non-transitory computer readable medium storing computer-executable instructions 108 to perform all or a portion of one or more operations described in this disclosure. In some examples, memory 106 may be configured to store one or more sets of anchor points.

While shown to be coupled to each other via the processor 104 in the example of FIG. 1, processor 104, memory 106, one or more processors 110, optional display 114, and optional I/O components 116 may be coupled to one another in various arrangements. For example, processor 104, memory 106, one or more processors 110, optional display 114, and/or optional I/O components 116 may be coupled to each other via one or more local buses (not shown for simplicity).

Display 114 may be any suitable display or screen allowing for user interaction and/or to present items (such as received images, video, or a preview image) for viewing by a user. In some aspects, display 114 may be a touch-sensitive display. I/O components 116 may be or include any suitable mechanism, interface, or device to receive input (such as commands) from the user and to provide output to the user. For example, I/O components 116 may include (but are not limited to) a graphical user interface, keyboard, mouse, microphone and speakers, and so on. Display 114 and/or the I/O components 116 may provide a preview image to a user and/or receive a user input for adjusting one or more settings of camera 102. For example, display 114 may be used by a user for selecting and/or deselecting an ROI of the scene (associated with a portion of image sensor 124) by touching a portion of a displayed preview image. One or more processors 110 may use the selected ROI for AF to determine a final camera lens position of camera lens 122.

In accordance with the techniques of the disclosure, image processor 112 may be configured to determine data associated with a distance between object 126 and device 100. Data associated with a distance between object 126 and device 100 may include one or more depth values stored in disparity terms and/or at quantized levels. Device 100 may determine a plurality of lens positions of camera lens 122 for camera 102 based on the data associated with the distance between object 126 and device 100. In some examples, to determine the plurality of lens positions of camera lens 122, image processor 112 may perform a coarse search. For example, image processor 112 may apply, with transmitter 101 and receiver 103, a ToF depth sensing process and/or laser AF process to determine the distance. Image processor 112 may be configured to determine, for each one of the plurality of lens positions, a respective focus value to generate a plurality of focus values. To determine, for each one of the plurality of lens positions, the respective focus value, image processor 112 is configured to determine, for each one of the plurality of lens positions, phase difference information (see FIGS. 12, 13). Determining a focus value for each one of a plurality of lens positions using a phase difference may improve an accuracy of the focus values compared to systems relying only on CDAF. Improving an accuracy of the focus values may increase a speed of AF, which may improve a user experience relating to a photography.

Image processor 112 may be further configured to determine a final lens position based on the plurality of focus values. For example, image processor 112 may determine to skip a fine search based on the focus value of a particular lens position satisfying a focus threshold and determine the final lens position as the particular lens position. Skipping the fine search based on the focus value of a particular lens position satisfying a focus threshold may help to reduce a time to determine a focus point of an autofocus operation compared to systems that always perform a fine search, which may potentially reduce a processing burden on image processor 112 and/or reduce a power consumption of image processor 112. Moreover, reducing a time to determine a focus point of an autofocus operation may improve a user experience. Additionally, in some examples, the techniques of this disclosure may reduce a time to determine a focus point of an autofocus operation in low light conditions.

In some examples, image processor 112 may determine a configuration for a fine search (e.g., a starting lens position, a direction of search, and/or a search range) based on the focus value of each respective lens position of the plurality of lens positions and may apply the fine search using the configuration. For instance, image processor 112 may apply a CDAF search using the configuration. Performing a fine search with a configuration determined using focus values for lens positions used to determine a distance may help to reduce a time to determine a focus point of an autofocus operation compared to systems that perform a fine search without configuration information, which may potentially reduce a processing burden on image processor 112 and/or reduce a power consumption of image processor 112. Moreover, reducing a time to determine a focus point of an autofocus operation may improve a user experience. Additionally, in some examples, the techniques of this disclosure may reduce a time to determine a focus point of an autofocus operation in low light conditions.

Figure 2A:
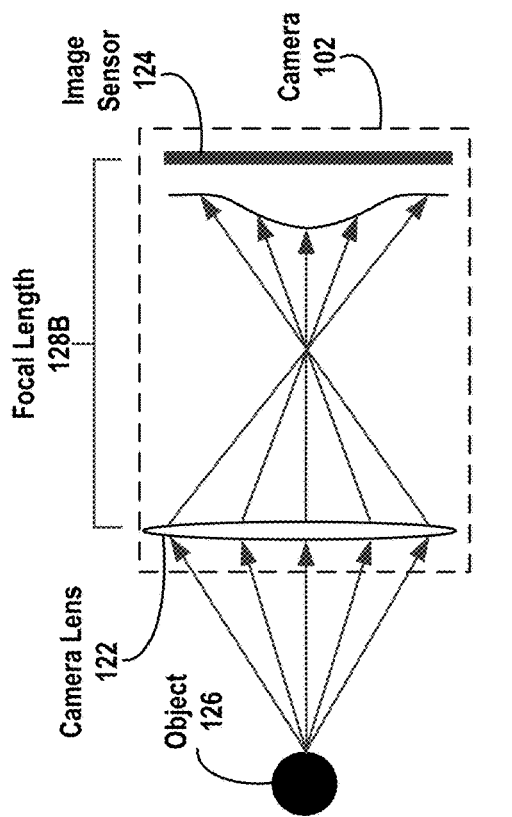
FIG. 2A is a depiction of an example camera lens at a focal length so that an object is in focus for autofocus (AF).
Figure 2B:
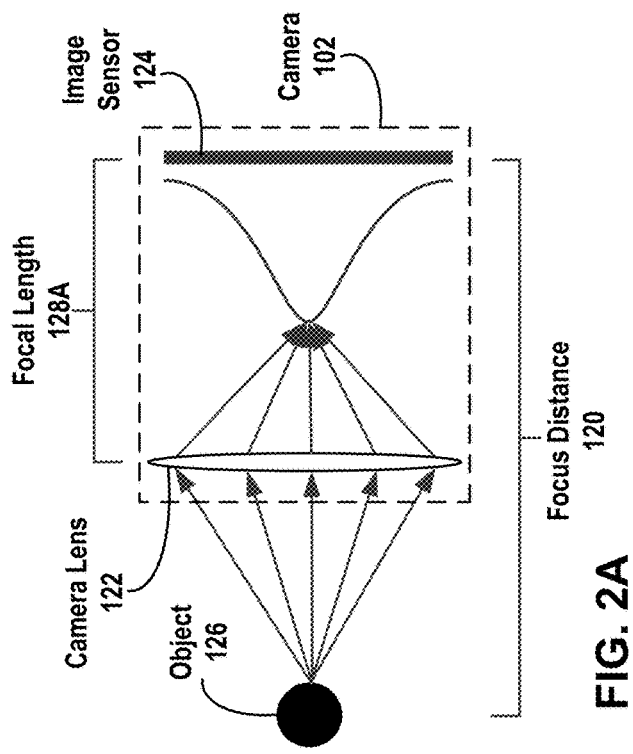
FIG. 2B is a conceptual diagram of an example camera lens at too long of a focal length so that the object is out of focus for contrast detection AF.
Figure 2C:
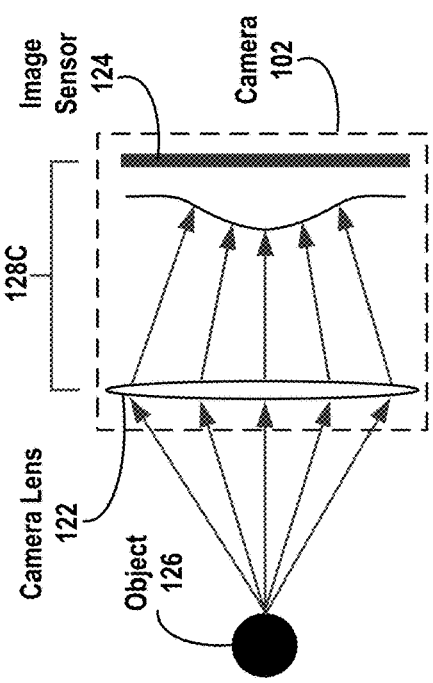
FIG. 2C is a conceptual diagram of an example camera lens at too short of a focal length so that the object is out of focus for contrast detection AF.

FIG. 2A is a depiction of a camera 102 with a camera lens 122 at a focal length 128A from the image sensor 124 so that an object 126 is in focus at focus distance 120. FIG. 2B is a depiction of the camera 102 with the camera lens 122 at too long of a focal length 128B so that the object 126 is out of focus. FIG. 2C is a depiction of the camera 102 with the camera lens 122 at too short of a focal length 128C so that the object 126 is out of focus.

The illustrated bumps/curves indicate the distribution of measured luminance of light from the object 126 and refracted by the camera lens 122 toward the image sensor 124. An object 126 is considered in focus when the distribution has a smaller standard deviation (which may be referred to as being tighter) than the distributions for the other focal lengths. As shown, the object 126 is out of focus when the distribution of measured light intensity for the object is spread out compared to the distribution for the focal length when the object is in focus. As illustrated, the curve depends on the position of camera lens 122 directing the light to the image sensor 124. If camera lens 122 is too far from the image sensor 124 (such as in FIG. 2B), the light from the object 126 is directed onto a larger portion of the image sensor 124 than if camera lens 122 is closer to the image sensor 124 (such as in FIG. 2A). Similarly, if camera lens 122 is too close to the image sensor 124 (such as in FIG. 2C), the light from the object 126 is directed onto a larger portion of the image sensor 124 than if camera lens 122 is closer to the image sensor 124 (such as in FIG. 2A). In this manner, the peak of the curve in FIG. 2A is greater than the peaks of the curves in FIG. 2B and FIG. 2C. While contrast is described as a difference in light intensity between neighboring pixels, contrast may be a difference in chrominance or a difference in some combination of chrominance and light intensity.

Figure 3:
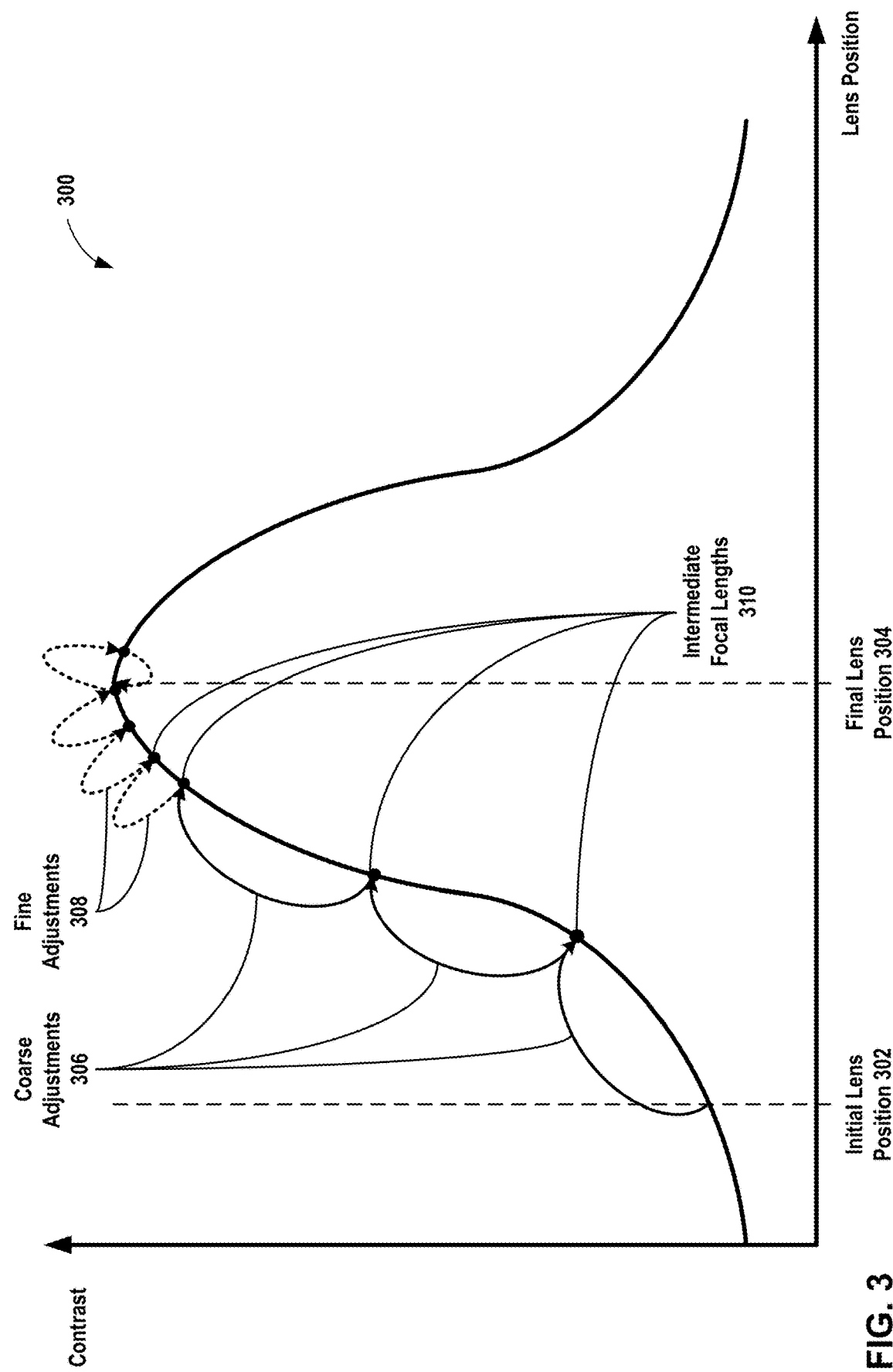
FIG. 3 is a conceptual diagram of an example correlation between focal length and contrast for contrast detection AF.

FIG. 3 is a depiction of an example correlation 300 between focal length and contrast for CDAF. Again, CDAF may be an example AF operation. As shown, the correlation 300 between lens position (e.g., a focal length) and contrast may be parabolic and/or second order. The correlation 300 is depicted as a continuous curve of contrast across lens positions. In some implementations, a correlation may be represented as a stepwise function, a dot plot, or other suitable discrete or continuous distribution. For example, a camera lens may be configured to be positioned in X number of lens positions. The correlation may include X number of contrasts, with each contrast associated with a lens position. The example correlations in the present disclosure are for the purpose of describing aspects of the disclosure, and the disclosure is not limited to a specific type of correlation. In addition, the exact curvature may differ, and the depictions are for illustrative purposes. For example, the correlation 300 may be expressed in general by a second order equation $y=ax^2+bx+c$, where the contrast is y, the focal length is x, the curvature of the parabola is indicated by a, the slope of the parabola is indicated by b, and the offset of the parabola is indicated by c.

The correlation 300 may be associated with an ROI of image sensor 124. For example, the ROI of image sensor 124 may be a center pixel or portion, and an object in a scene received by the center of the image sensor is associated with the focal lengths. Final lens position 304 for which the object is in focus corresponds to the contrast being at a maximum compared to the contrasts for other focal lengths. For the example correlation 300, the final lens position 304 is associated with the vertex. For a correlation represented by a second order equation $y=ax^2+bx+c$, the vertex may be $-b/2a$.

The correlation 300 indicates a relationship between focal lengths and contrasts measured by the image sensor. However, correlation 300 may not be known to image processor 112. Instead, image processor 1120, when performing CDAF, may cause camera 102 (e.g., with step controller 123) to move camera lens 122 in a recursive manner until image processor 112 identifies the peak contrast (which may be associated with the final lens position 304). To perform CDAF, step controller 123 may place camera lens 122 at an initial position, a frame is received with camera lens 122 positioned, and image processor 112 may determine a contrast from the frame for an ROI of image sensor 124. Image processor 112 may iteratively move, with step controller 123, camera lens 122 (e.g., forwards and backwards), receive a frame, and determine contrast until determining a sufficient contrast (such as a peak contrast). Referring to correlation 300, image processor, with step controller 123, may position camera lens 122 at an initial lens position 302 (e.g., at minimum lens position) to begin CDAF and may move camera lens 122. Example movements may include coarse adjustments 306 and fine adjustments 308, with coarse adjustments 308 associated with larger lens position movements than fine adjustments 306. Referring to the correlation 300, coarse adjustments 306 allow an approach to the final lens position 304 in a fewer number of frames than exclusively using fine adjustments 308, while using fine adjustments 308 allows for less overshoot and error in determining the final lens position 304. Coarse adjustments 306 and fine adjustments 308 may be fixed or variable in size, pre-configured or configurable, or any other suitable types of focal length adjustments for CDAF.

In the example of FIG. 3, camera 102 may perform course adjustment 306 and fine adjustments 308 iteratively until determining final lens position 304. For example, image processor 112 may determine a contrast for initial lens position 302, and may perform coarse adjustments 306 to adjust the focal length to intermediate focal lengths 310. Image processor 112 may determine a contrast for each of the intermediate focal lengths 310 and iteratively perform coarse adjustments 306. The process may repeat until image processor 112 determines one of intermediate focal lengths 310 is within a threshold of the final lens position 304. Image processor 112 may repeat the course adjustment process until the contrast is above a threshold. Once above the threshold, image processor 112 may perform fine adjustments 308. For example, image processor 112 may perform coarse adjustments 306 if the difference between a previous contrast and a current contrast is increasing, the same as previous differences, or greater than a threshold difference between intermediate focal lengths 310 to converge to final lens position 304. In some examples, image processor 112 may stop performing coarse adjustments 306 if the difference between a previous contrast and a current contrast is decreasing, or is less than a threshold difference between intermediate focal lengths 310. Image processor 112 may perform fine adjustments 308 until converging to final lens position 304. As shown, image processor 112 may overshoot final lens position 304 when fine adjustments 308 are converging to final lens position 304, may overshoot the final lens position 304. As noted, image processor 112 may perform a CDAF technique that is an iterative process of measuring the contrast for a ROI with camera lens 122 at different focal lengths, adjusting the focal length, and again measuring the contrast until determining a final lens position 304. Image processor 112 may apply both coarse adjustments 306 and fine adjustments 308, which may reduce the number of frames used for an AF operation compared to systems exclusively performing fine adjustments. Image processor 112 may perform CDAF using 12 or more frames.

Figure 4:
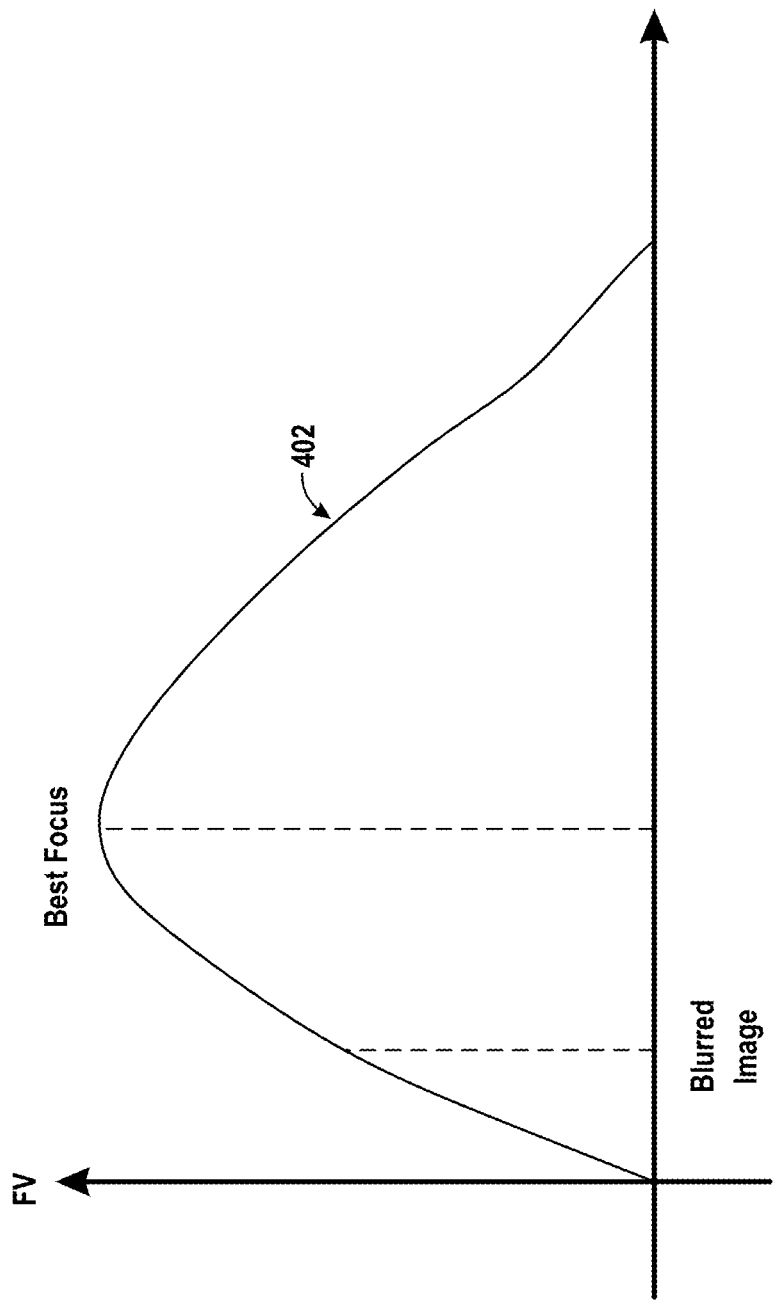
FIG. 4 is a conceptual diagram of an example of a contrast detection autofocus technique.

FIG. 4 is a conceptual diagram of an example of a contrast auto focus technique. At each lens stop position, device 100 may determine a focus value (FV) is reported. A FV curve 402 can be plotted in terms of various lens stop positions. The higher the focus value is, the better the focus will be. The peak of the FV curve 402 may represent the lens stop position where the best (e.g., highest) focus is obtained.

Figure 5A:
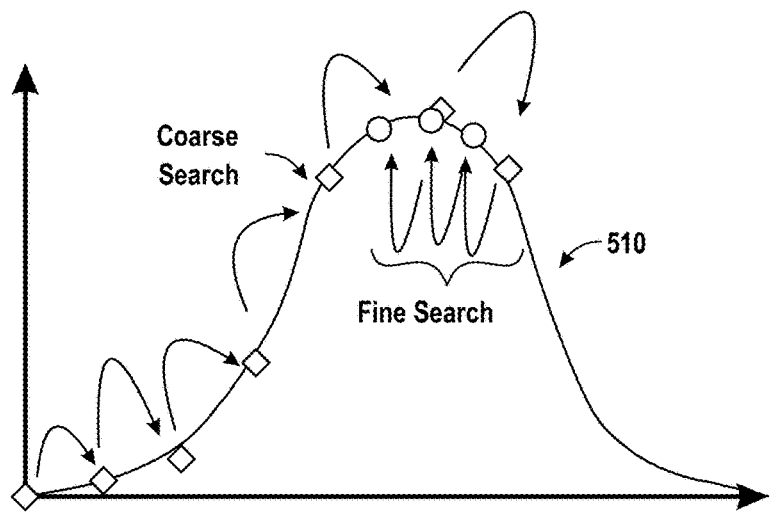
FIG. 5A is a conceptual diagram of a contrast detection autofocus technique.

FIG. 5A is a conceptual diagram of a contrast detection autofocus technique. In the example of FIG. 5A, image processor 112 may perform a course search operation that uses 12 frames and a fine search operation that uses 3-5 frames to determine the peak of FV curve 510. In FIG. 5A, the horizontal axis represents a lens position and the vertical axis represents a focus measure, such as, a degree of sharpness or degree of focus of an image or image pixel.

Contrast AF=Coarse search(12frames)+Fine search (3-5frames)

In general, CDAF may result in overshooting or focus hunting in order to get a reliable focus peak. Compared to active-depth assisted focus and PDAF, CDAF results in a relatively low focus speed, which may lead to a poor user experience that is relatively low.

Figure 5B:
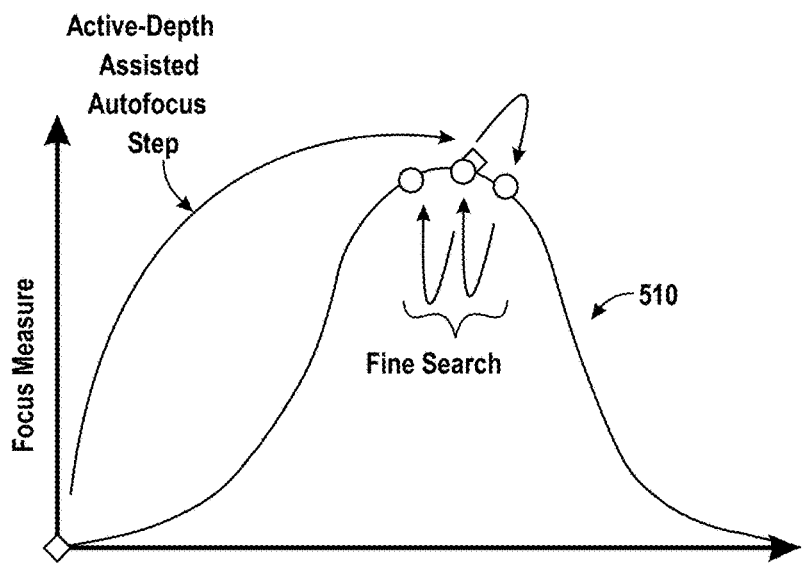
FIG. 5B is a conceptual diagram of an active-depth assisted focus technique.

FIG. 5B is a conceptual diagram of an active-depth assisted focus technique. In the example of FIG. 5B, image processor 112 may perform a course search operation that uses 1-2 frames and a fine search operation that uses 5 frames to determine the peak of the FV curve 510. In FIG. 5B, the horizontal axis represents a lens position and the vertical axis represents a focus measure, such as, a degree of sharpness or degree of focus of an image or image pixel. Device 100 may use laser AF as an active-depth assisted focus technique for example purposes only.

Laser AF=Laser Assisted(~1-2frames)+Fine search (~5frames)

Compared to CDAF and PDAF, active-depth assisted focus comprises a focus speed that is high and user experience that is relatively good. However, active-depth assisted focus may include focus hunting due to a fine search. Active-depth assisted focus may provide good results in low light environments compared to other AF techniques.

Figure 5C:
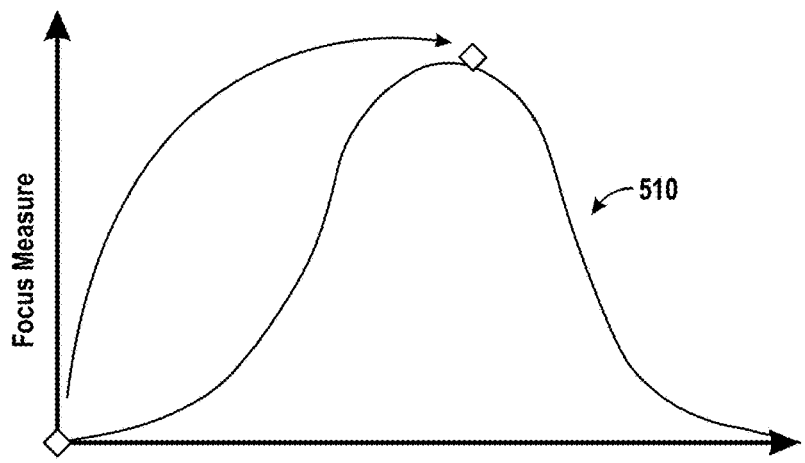
FIG. 5C is a conceptual diagram of a phase detection (PD) autofocus technique.

FIG. 5C is a conceptual diagram of a phase detection (PD) autofocus technique. In the example of FIG. 5C, image processor 112 may perform a course search operation that uses 1-2 frames and a fine search operation that uses zero or more frames to determine the peak of the FV curve 510.

PD(Phase Detection)AF=PD AF(~1-2frames)+Fine search(optional)

Compared to CDAF and active-depth assisted focus, PDAF comprises a focus speed that is high and a user experience that is relatively good by not having any focus hunting. However, PDAF may not be accurate in low light environments.

Figure 6A:
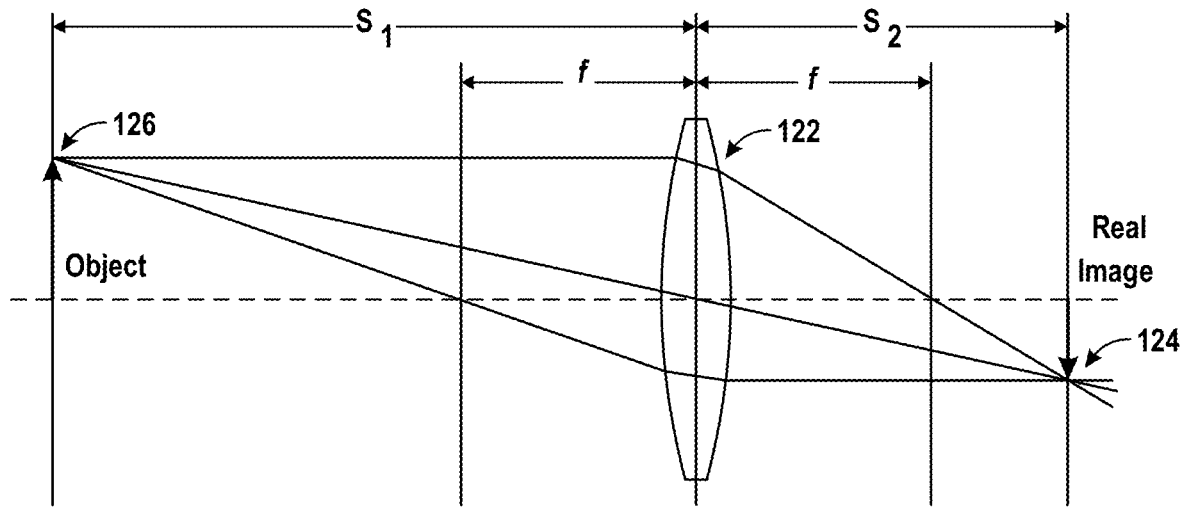
FIG. 6A is a conceptual diagram of active-depth assisted focus features.

FIG. 6A is a conceptual diagram of active-depth assisted focus features. FIG. 6A discusses limitations of active-depth assisted focus. Specifically, FIG. 6A illustrates a distance to lens position and a theory of distance verses a lens position.

As shown in FIG. 6A, a focal length (f) of camera lens 122 defines the relations between a distance ($S_1$) from camera lens 122 and object 126 and a distance ($S_2$) from camera lens 122 and image sensor 124 of camera 102 as described in EQUATION 1.

$$\frac{1}{S_1} + \frac{1}{s_2} = \frac{1}{f} \qquad \text{EQUATION 1}$$

Solving equation 1 for the distance ($S_2$) from camera lens 122 and image sensor 124 results in equation 2

$$S_2 = f * \frac{S_1}{S_1 - f} \qquad \text{EQUATION 2}$$

Solving equation 2 for a lens shift in microns (i.e., $S_2$–f) results in equation 3.

$$S_2 - f = f * \frac{S_1}{S_1 - f} \qquad \text{EQUATION 3}$$

Using equation 3, image processor 112 may calculate a lens shift based on the focal length of camera lens 122 and the distance ($S_1$) from object 126. In this way, image processor 112 may provide AF without relying on CDAF, which may reduce a time to determine a focus point of an autofocus operation, which may potentially reduce a processing burden on image processor 112 and/or reduce a power consumption of image processor 112.

Several factors make accuracy worse for distance to lens position mapping of equation 3, such as, for example, a voice-coil motor (VCM) issue (e.g., a gravity offset, hysteresis, etc.), an AF calibration (e.g., an accuracy of inf, macro, etc.), and a temperature (e.g., an effective focal length (EFL) shift). As such, when using active-depth assisted focus techniques, image processor 112 may apply a fine scan that takes an additional 5 frames performing lens position mapping. In this way, an accuracy of the AF using active-depth assisted focus may be improved.

Figure 6B:
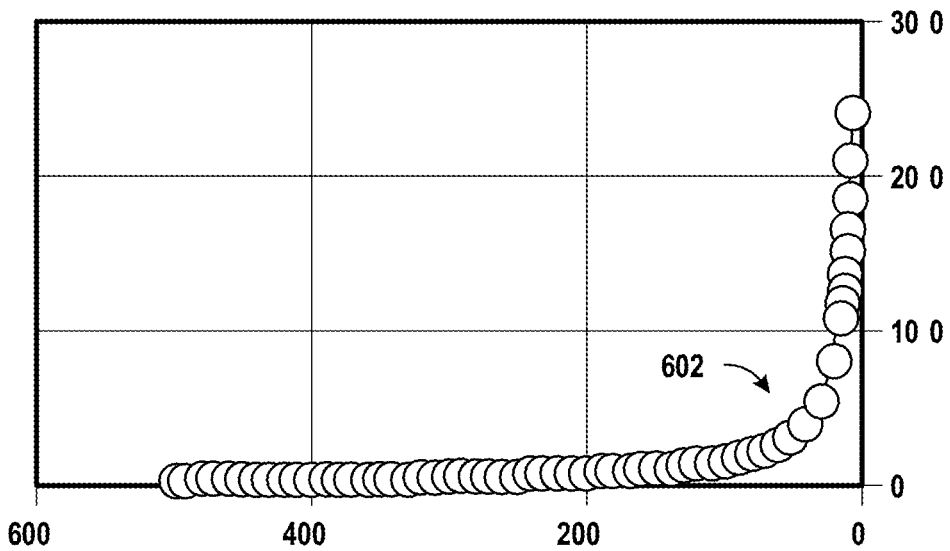
FIG. 6B is a graph diagram of active-depth assisted focus features.

FIG. 6B is a graph diagram of active-depth assisted focus features. In the example of FIG. 6B, the horizontal axis represents distance ($S_1$) from camera lens 122 and an object 126 with decreasing values from infinity and the vertical axes represents distance ($S_2$) from camera lens 122 and image sensor 124. As shown, curve 602 shows that the distance ($S_2$) from camera lens 122 and image sensor 124 of a camera increases (e.g., moves from 0 to 250) as a distance ($S_1$) from camera lens 122 and an object 126 decreases (e.g., moves from 600 to 0).

Figure 7:
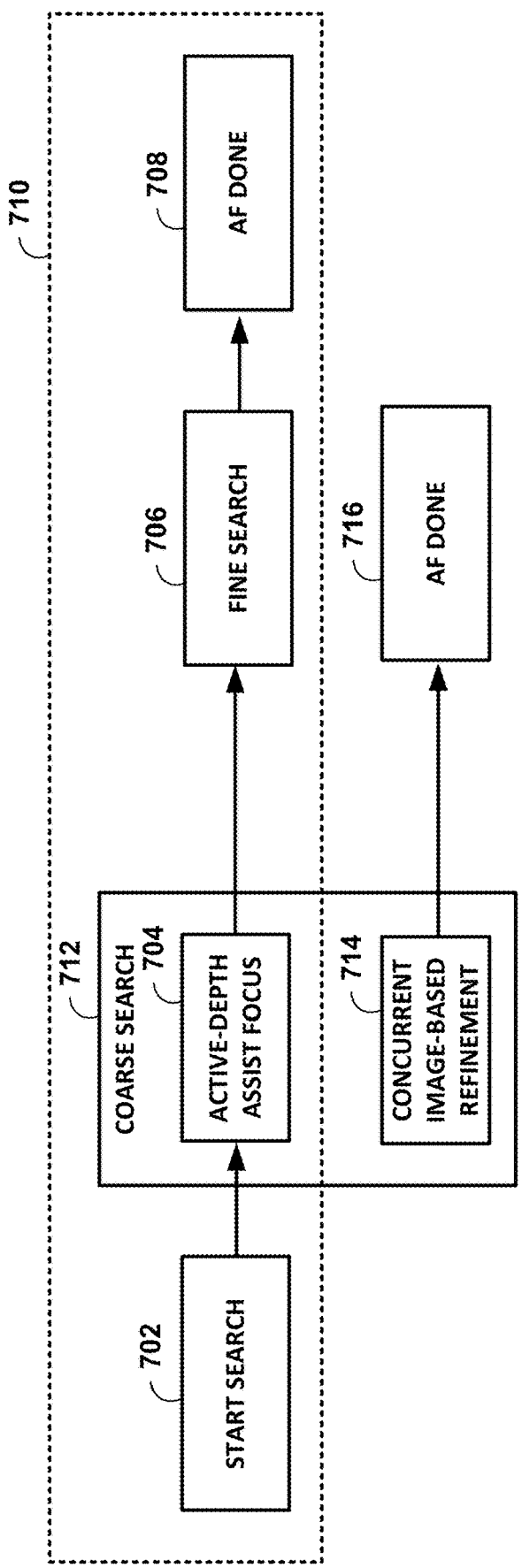
FIG. 7 is a block diagram of a concurrent active-depth assisted focus algorithm, in accordance with the techniques of the disclosure.

FIG. 7 is a conceptual diagram of a concurrent active-depth assisted focus algorithm, in accordance with the techniques of the disclosure. Image processor 112 may start a search (e.g., a course search) for a final lens position (702). For instance, image processor 112 may initiate a process to determine the distance ($S_2$) from camera lens 122 and image sensor 124 for an object 126 that is a region of interest. In the example of FIG. 7, image processor 112 may perform an active-depth assisted focus, such as, for example, laser autofocus or ToF (704). For example, image processor 112 may determine a time-of-flight to determine the distance ($S_1$) from camera lens 122 and object 126. In this example, image processor 112 may determine the distance ($S_2$) from camera lens 122 and image sensor 124 for object 126 using equation 3.

Active-depth assisted focus (e.g., step 704) may only output a distance to object 126. In this example, image processor 112 may determine a generate a lens position mapping to determine a final lens position. However, the mapping function may be impacted by VCM gravity, hysteresis, and the lens position calibration. As such, image processor 112 may apply a fine search (706), such as, for example, CDAF, until the AF process is done (708). For example, image processor 112 may apply the fine search process contrast AF refinement process illustrated in FIG. 5B until the FV converges to a peak value. In this way, the contrast AF refine search may help to mitigate one or more of the VCM issue, the AF calibration issue, and the temperature issue described in FIGS. 6A, 6B.

One or more problems may exist in active-depth assisted focus followed by a fine scan 710 (e.g., performing coarse search 712 and skipping concurrent image-based refinement 714). For example, active-depth assisted focus followed by a fine scan 710 may not be as fast as PDAF. For example, because active-depth assisted focus followed by a fine scan 710 does not process actual images (e.g., perform concurrent image-based refinement 714) during active-depth assisted focus (e.g., step 704), image processor 112 may add a fine search (e.g., step 706) after active-depth assisted focus to ensure that the selected lens position of camera lens 122 is accurate, which may lead the active-depth assisted focus followed by a fine scan process being not as fast as PDAF.

For example, image processor 112 may cause step controller 123 to move camera lens 122 backwards and forwards to find the peak FV value. Therefore, the user experience may be poor when applying active-depth assisted focus followed by a fine scan 710 because the autofocus is relatively slow.

Techniques described herein may address one or more of the above problems and/or one or more other problems. For example, techniques described herein may configure image processor 112 to use concurrent active-depth assisted focus techniques, which may improve the active-depth assisted focus speed and accuracy by adding concurrent image-based focus refinement.

In accordance with the techniques of the disclosure, image processor 112 may apply active-depth assisted focus 704 with a concurrent image-based focus refinement (714) until the AF process is done (716). That is, while step controller 123 moves camera lens 122 to perform active-depth assist focus 704, image processor 112 may perform concurrent image-based refinement 714 to determine a focus value for a set of images captured when performing active-depth assist focus 704. In this way, fine search 706 may be skipped, which may result in the AF being smoother compared to systems that use active-depth assisted focus 704 followed by fine search 706. For instance, using active-depth assisted focus 704 with concurrent image-based focus refinement 714 may allow image processor 112 to skip the process of moving camera lens 122 backwards and forwards to find the peak FV value for fine search 706.

Figure 8A:
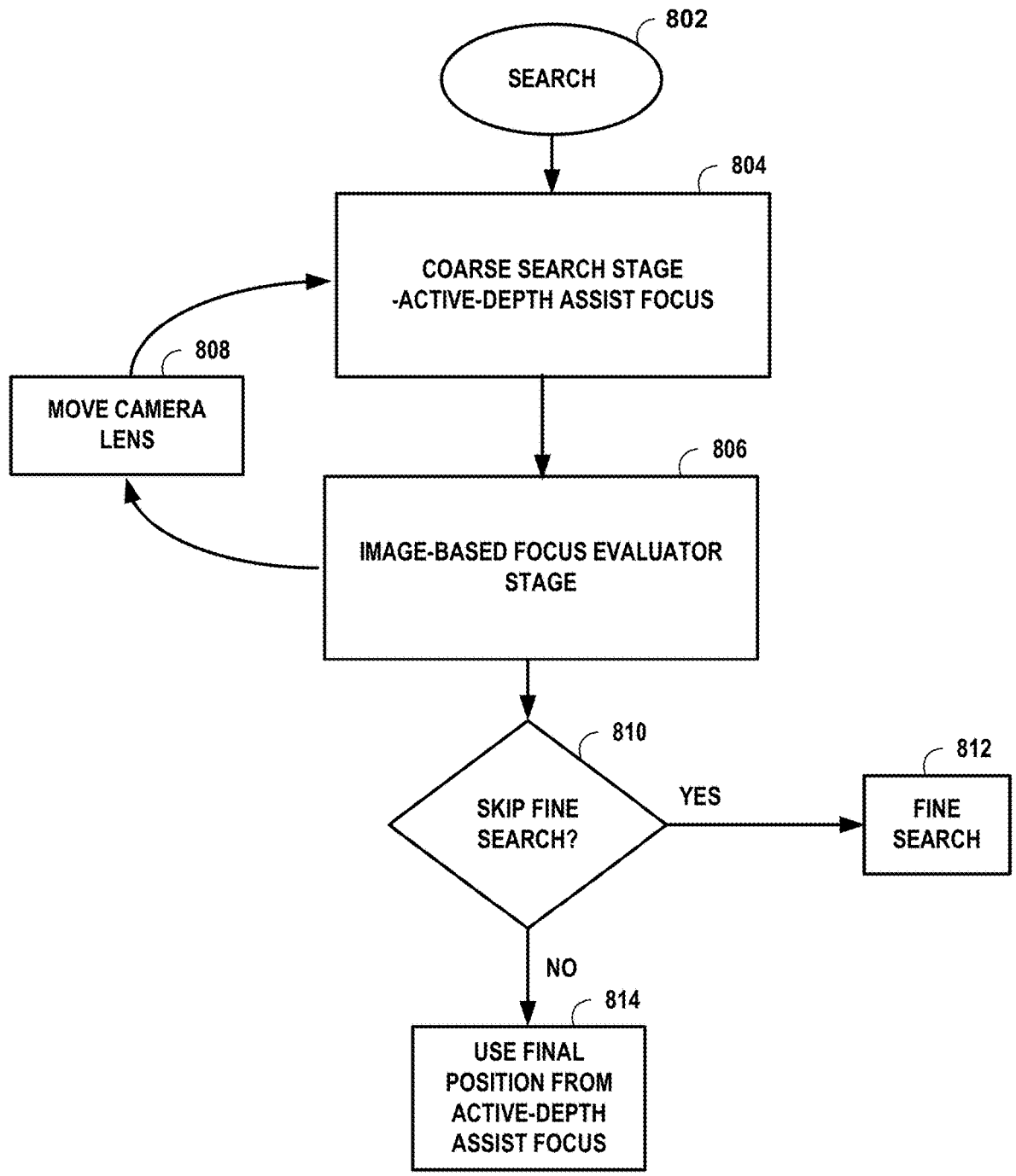
FIG. 8A is a flowchart showing an example technique for an active-depth assisted focus with concurrent image-based refinement, in accordance with the techniques of the disclosure.

FIG. 8A is a flowchart showing an example technique for active-depth assisted focus with concurrent image-based refinement, in accordance with the techniques of the disclosure. Image processor 112 may start a search for a final lens position (802). For instance, image processor 112 may initiate a process to determine the distance ($S_2$) from camera lens 122 and image sensor 124 for object 126 that is a region of interest. During a coarse search stage 804, image processor 112 may use an active-depth assisted focus to obtain the converted target distance (e.g., distance from object 126). Image processor 112 may determine the distance using, for example a laser focus on the target scene. In the example of FIG. 8A, image processor 112 may apply laser focus, however, image processor 112 may apply any active-depth assisted focus. For instance, image processor 112 may apply a ToF algorithm to determine the distance.

During an image-based focus evaluator stage 806, image processor 112 may calculate focus values (e.g., contrast and/or phase difference information) from an image at each lens position for camera lens 122. For example, image processor 112 may calculate the focus value based on the image content for each lens position of camera lens 122. Image processor 112 may perform the focus value calculation using any kind of a contrast AF algorithm and/or PD algorithm.

During image-based focus evaluator stage 806, image processor 112 may receive one or more of: (1) contrast information for a horizontal direction; (2) contrast information for a vertical direction; and/or (3) PD information. Image processor 112 may calculate one or more of: (1) a fitting peak; and (2) a confidence (e.g., the confidence can determined by the shape of a fitting curve). In some examples, image processor 112 may determine the shape of the fitting curve by one or more properties of the fitting curve, where the one or more properties of the fitting curve may include one or more of a shape, a value, and a peak of the fitting curve.

Image processor 112, with step controller 123, may move (e.g., step) camera lens 122 to a next step lens position (808). Image processor 112, with step controller 123, may move to another lens position based on a preconfigured step size. After collecting data from enough steps (e.g., two or more steps), image processor 112 may use data collected during the image-based focus evaluator stage (e.g., contrast information and/or phase difference information) to determine whether or not to skip the fine search (810).

Figure 12:
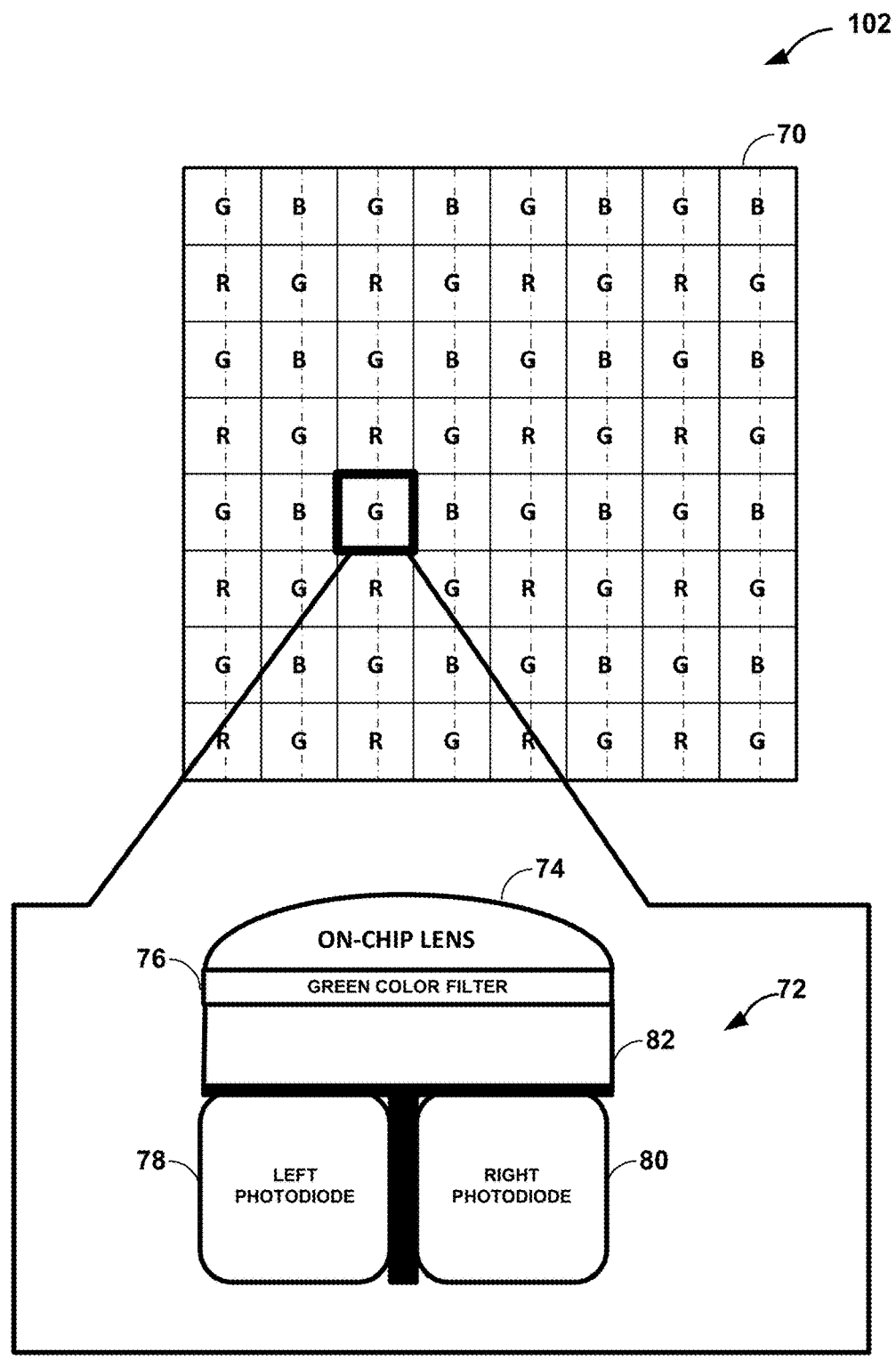
FIG. 12 is a conceptual diagram of an example phase detection auto focus (PDAF) sensor.
Figure 13:
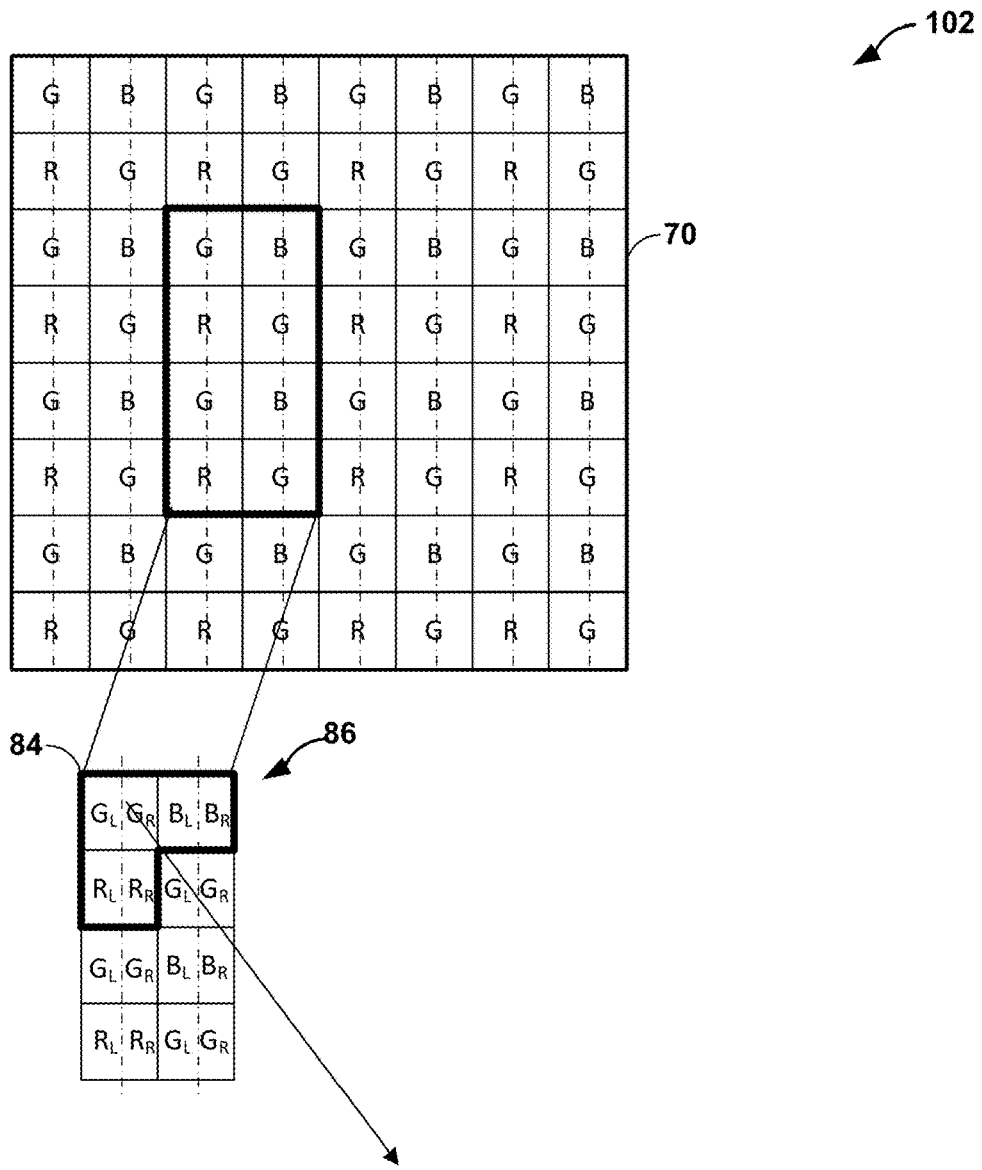
FIG. 13 is a conceptual diagram showing one example technique for determining phase difference pixel data in a PDAF sensor.

To determine, for each one of the plurality of lens positions, the respective focus value, image processor 112 may be configured to determine, for each one of the plurality of lens positions, phase difference information (see FIGS. 12, 13). Determining a focus value for each one of a plurality of lens positions using a phase difference may improve an accuracy of the focus values compared to systems relying only on CDAF. Improving an accuracy of the focus values may increase a speed of AF, which may improve a user experience relating to a photography.

For example, image processor 112 may determine to not skip the fine search ("NO" of step 810) in response to a determination that each focal value determined in step 806 is less than a threshold focal value. In some examples, image processor 112 may determine to skip the fine search ("YES" of step 810) in response to determining that at least one focal value determined in step 806 is greater than a threshold focal value.

In response to determining to apply fine search ("YES" of step 810), image processor 112 may apply fine search (812). For example, image processor 112 may apply a contrast AF fine search (see fine search in FIG. 5B). In some examples, image processor 112 may determine a configuration for a fine search (e.g., a starting lens position, a direction of search, and/or a search range) based on the focus value of each respective lens position of the plurality of lens positions and may apply the fine search using the configuration. For instance, image processor 112 may apply a CDAF search using the configuration. Performing a fine search with a configuration determined using focus values for lens positions used to determine a distance may help to reduce a time to determine a focus point of an autofocus operation compared to systems that perform a fine search without configuration information, which may potentially reduce a processing burden on image processor 112 and/or reduce a power consumption of image processor 112. Moreover, reducing a time to determine a focus point of an autofocus operation may improve a user experience. Additionally, in some examples, the techniques of this disclosure may reduce a time to determine a focus point of an autofocus operation in low light conditions.

In response to determining not to apply the fine search ("NO" of step 810), image processor 112 may skip the fine search and use a final position from active-depth assist focus (814). For example, image processor 112 may select a lens position of camera lens 122 used during coarse search stage 804 that image processor 112 determined to have the largest focal value (e.g., using contrast and/or phase difference values). Skipping the fine search based on the focus value of a particular lens position satisfying a focus threshold may help to reduce a time to determine a focus point of an autofocus operation with little or no loss to AF accuracy compared to systems that always perform a fine search, which may potentially reduce a processing burden on image processor 112 and/or reduce a power consumption of image processor 112. Moreover, reducing a time to determine a focus point of an autofocus operation may improve a user experience. Additionally, in some examples, the techniques of this disclosure may reduce a time to determine a focus point of an autofocus operation in low light conditions.

Figure 8B:
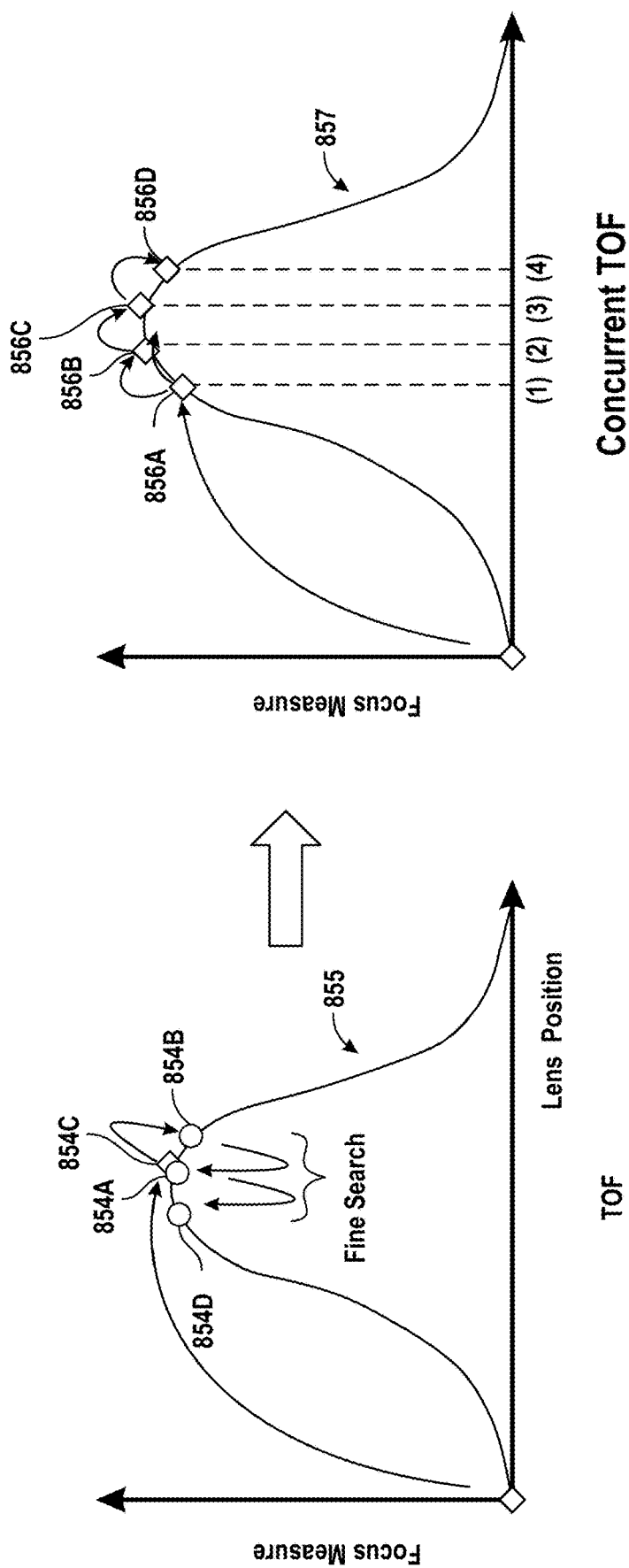
FIG. 8B is a conceptual diagram showing an example technique for an active-depth assisted focus with concurrent image-based refinement, in accordance with the techniques of the disclosure.

FIG. 8B is a conceptual diagram showing an example technique for active-depth assisted focus with concurrent image-based refinement, in accordance with the techniques of the disclosure. Image processor 112, with step controller 123, may perform step 808 of FIG. 8A. In FIG. 8B, the horizontal axis represents a lens position of camera lens 122 and the vertical axis represents a focus measure, such as, a degree of sharpness or degree of focus of an image or image pixel captured by image sensor 124.

Using active-depth assisted focus followed by a fine scan (e.g., preforming steps 804 and 808 and skipping step 806), image processor 112, with step controller 123, may step to lens position 854A based on a time of flight. For instance, image processor 112 may apply a ToF algorithm to determine the distance and determine lens position 854A based on the distance. In this example, image processor 112, with step controller 123, may step from lens position 854A to lens position 854B, to lens position 854C, and to lens position 854D to perform a fine search (e.g., step 812). Image processor 112 may select position lens position 854A in response to determining that lens position 854A has a highest focal value on FV curve 855. As noted above, image processor 112, with step controller 123, may step camera lens 122 backwards and forwards (e.g., between lens positions 854A-854D) to find the peak FV value of FV curve 855. Therefore, the user experience may be poor when applying active-depth assisted focus followed by a fine scan because the autofocus is relatively slow.

Techniques described herein may address one or more of the above problems and/or one or more other problems. For example, techniques described herein may use concurrent active-depth assisted focus techniques, which may improve the active-depth assisted focus speed and accuracy by adding concurrent image-based focus refinement.

In accordance with the techniques of the disclosure, image processor 112 may apply an active-depth assisted focus with a concurrent image-based focus refinement (e.g., steps 804-808). For example, after image processor 112 calculates the focus value (e.g., using contrast information and/or PD information) of images captured during a coarse search (e.g., step 806), image processor 112 may decide the next movement as shown in FIG. 8B. That is, rather than stepping back and forth for lens positions 854A-854D to identify a peak FV along FV curve 857, techniques described herein may configure image processor 112 to determine a direction to move camera lens 122 (e.g., only forward) that corresponds to an increase in FV along FV curve 857. In some examples, image processor 112 may determine a search range for moving camera lens 122. In this way, image processor 112 may determine the peak FV along FV curve 857 faster than techniques that step back and forth for lens positions (e.g., for lens positions 854A-854D) even when fine search 812 is not skipped.

For example, the step controller may step from lens position 856A to lens position 856B, to lens position 856C, and to lens position 856D. Step sizes between lens positions 856A-856D may be preconfigured. In some examples, lens positions 856A-856D may form a range of lens positions that includes a lens position corresponding to a focal point for the distance of an object. For example, the first lens position 856A may be offset from the peak as determined using the object distance. In some examples, the actual object distance would correspond to lens position 856C.

Figure 9A:
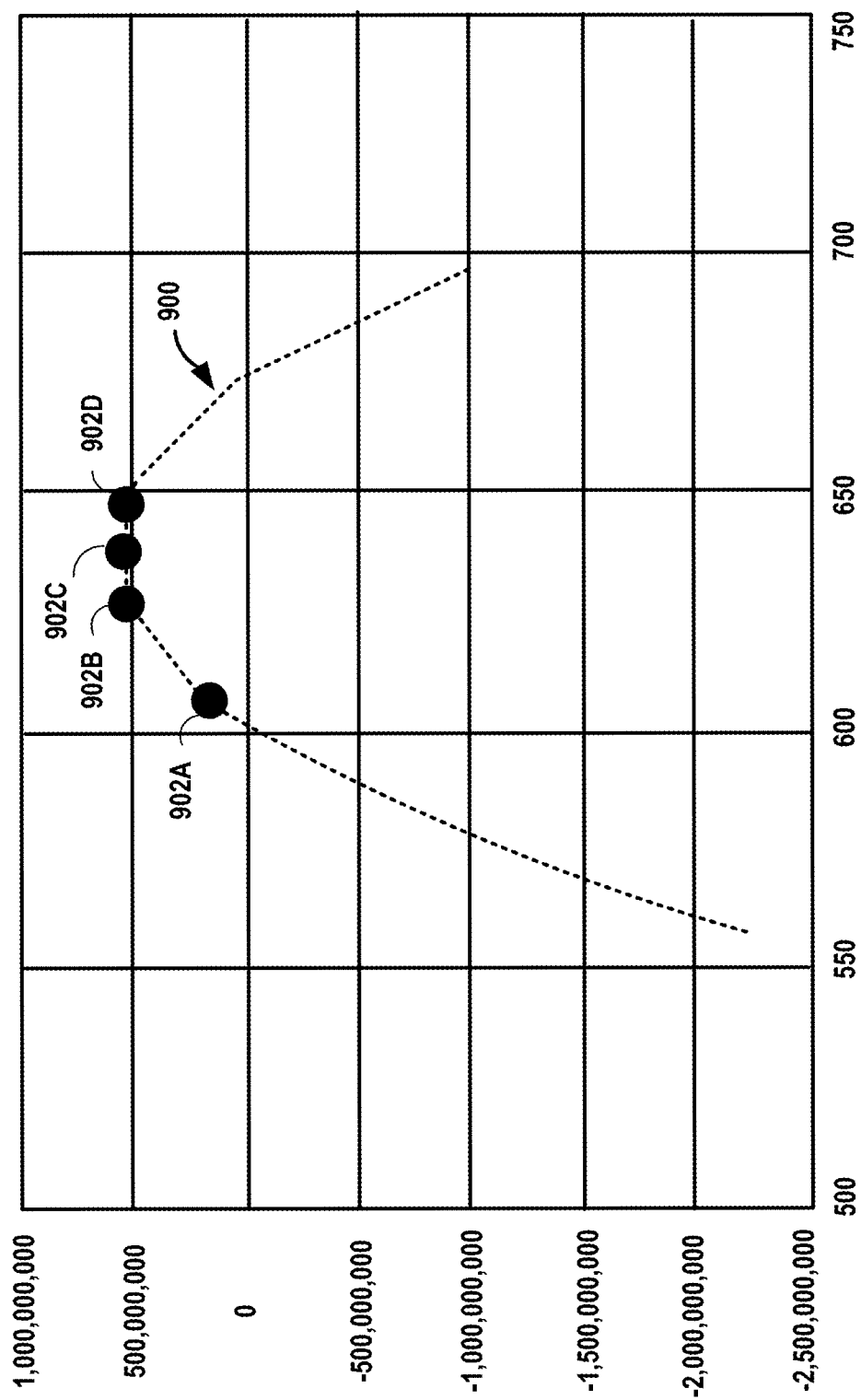
FIG. 9A is a conceptual diagram showing an example of least square polynomial fitting, in accordance with the techniques of the disclosure.

FIG. 9A is a conceptual diagram showing an example of least square polynomial fitting process, in accordance with the techniques of the disclosure. Lens positions 902A-902D (collectively, "lens positions 902") each correspond to a respective lens position (e.g., (1), (2), (3), (4)) of the focal curve 900. Curve 900 may represent a curve determined using a least square polynomial fitting process.

For example, image processor 112 may determine data associated with a distance between object 126 and device 100 using active-depth assisted focus. In this example, image processor 112 may determine a plurality of lens positions of camera lens 122 based on the distance from object 126. For example, image processor 112 may determine lens position 902C as an estimated peak focus value mapped to the distance from object 126. In this example, image processor 112 may determine a second lens position 902B by subtracting a preconfigured step size from the third lens position and determine lens position 902A by subtracting the preconfigured step size from the second lens position. Similarly, the step controller may determine 902D by adding the preconfigured step size to 902C.

Image processor 112 may determine, for each one of lens positions 902, a respective focus value to generate a plurality of focus values. For example, image processor 112 may determine, for each one of lens positions 902, phase difference information using PDAF techniques (e.g., see FIGS. 12-13). In some examples, the image processor 112 may determine, for each one of lens positions 902, contrast information for a horizontal direction and/or contrast information for a vertical direction using CDAF techniques.

Figure 9B:
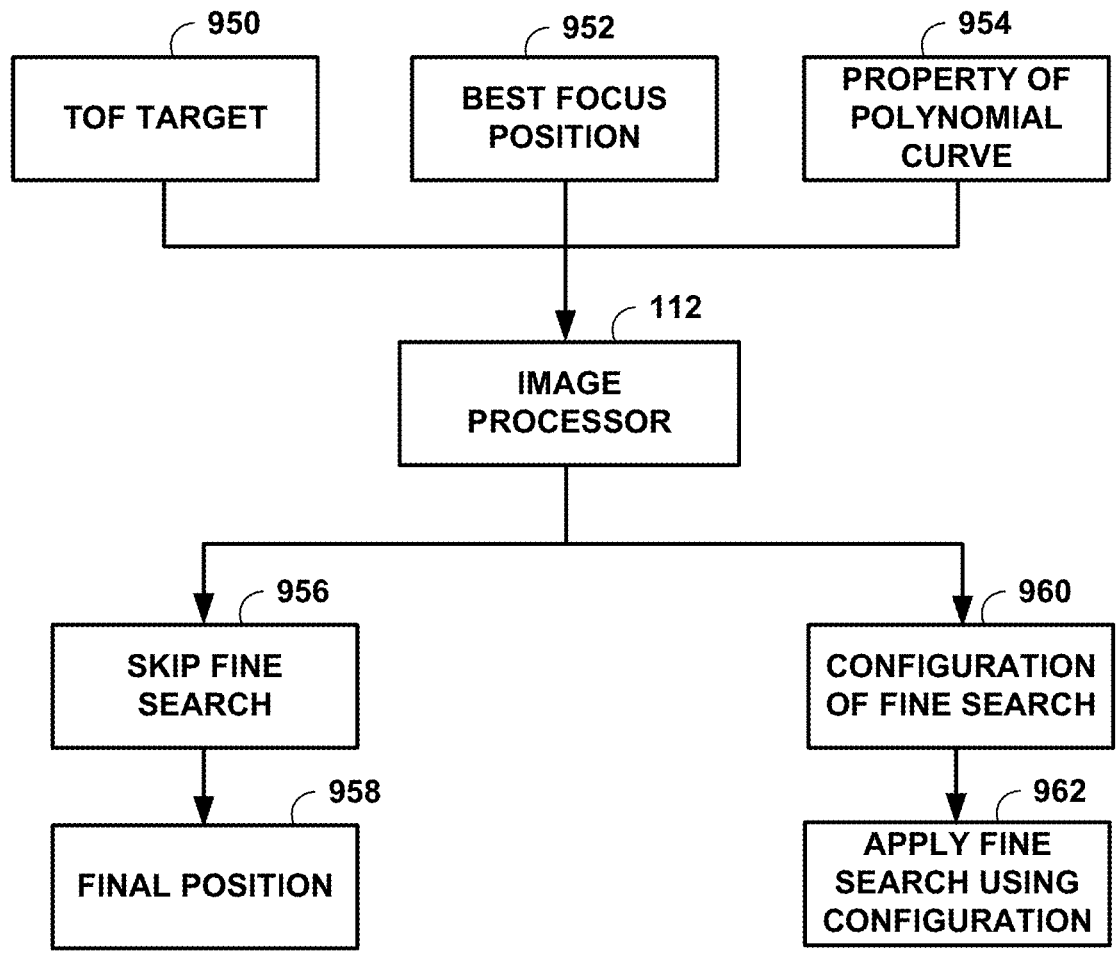
FIG. 9B is a conceptual diagram showing example details of a fine search controller configured for an active-depth assisted focus with concurrent image-based refinement, in accordance with the techniques of the disclosure.

FIG. 9B is a conceptual diagram showing an example details of a process for active-depth assisted focus with concurrent image-based refinement, in accordance with the techniques of the disclosure. Image processor 112 may use a curve fitting method (e.g., a least square polynomial curve fitting method) to obtain the peak of a polynomial as the best focus position (e.g., a peak of curve 900 of FIG. 9A).

$$y = a_k x^k + \ldots + a_1 x + a_0 + \in \qquad \text{EQUATION 4}$$

After obtaining the best focus position, image processor 112 may consider one or more of the following to determine a best focus position.

1. A ToF target 950 using, for example, an active-depth assisted focus target (e.g., a distance to object)
2. A best focus position 952 (e.g., the fitting peak)
   active-depth assisted focus target and the best focus position should be within a reasonable range to ensure the correctness of fitting peak.
3. The property of the polynomial curve 954 (e.g. shape, value, peak, etc.)
   if the curve is not sharp enough, the fitting peak may not be accurate.

Using one or more of the ToF target 950, best focus position 952, and property of the polynomial curve 954, image processor 112 may skip a fine search 956 and may determine the final position 958 that corresponds to a selected lens position of camera lens 122. For example, in response to determining that the best focus position is within a reasonable range (e.g., within a threshold FV), image processor 112 may skip fine search 956 and use final position 958 from best focus position 952.

If a fine search cannot be skipped based on one or more of the ToF target 950, best focus position 952, and property of the polynomial curve 954, image processor 112 may determine a configuration of a fine search 960 and apply a fine search using the configuration 962. For example, image processor 112 may determine a direction (e.g., forwards or backwards) to move camera lens 122 using one or more of the ToF target 950, best focus position 952, and property of the polynomial curve 954. For instance, image processor 112 may determine a direction using a current position and a search range. Image processor 112 may determine a search range based on peak FV values of contrast information and/or PD information. In some examples, image processor 112 may determine a starting position for a fine search based on one or more of a ToF target, a peak point (e.g., Hpeak and/or Vpeak), and PD information. For instance, image processor 112 may determine the starting point, direction, and search range based on the ToF target, the peak point, and the PD information.

Figure 10:
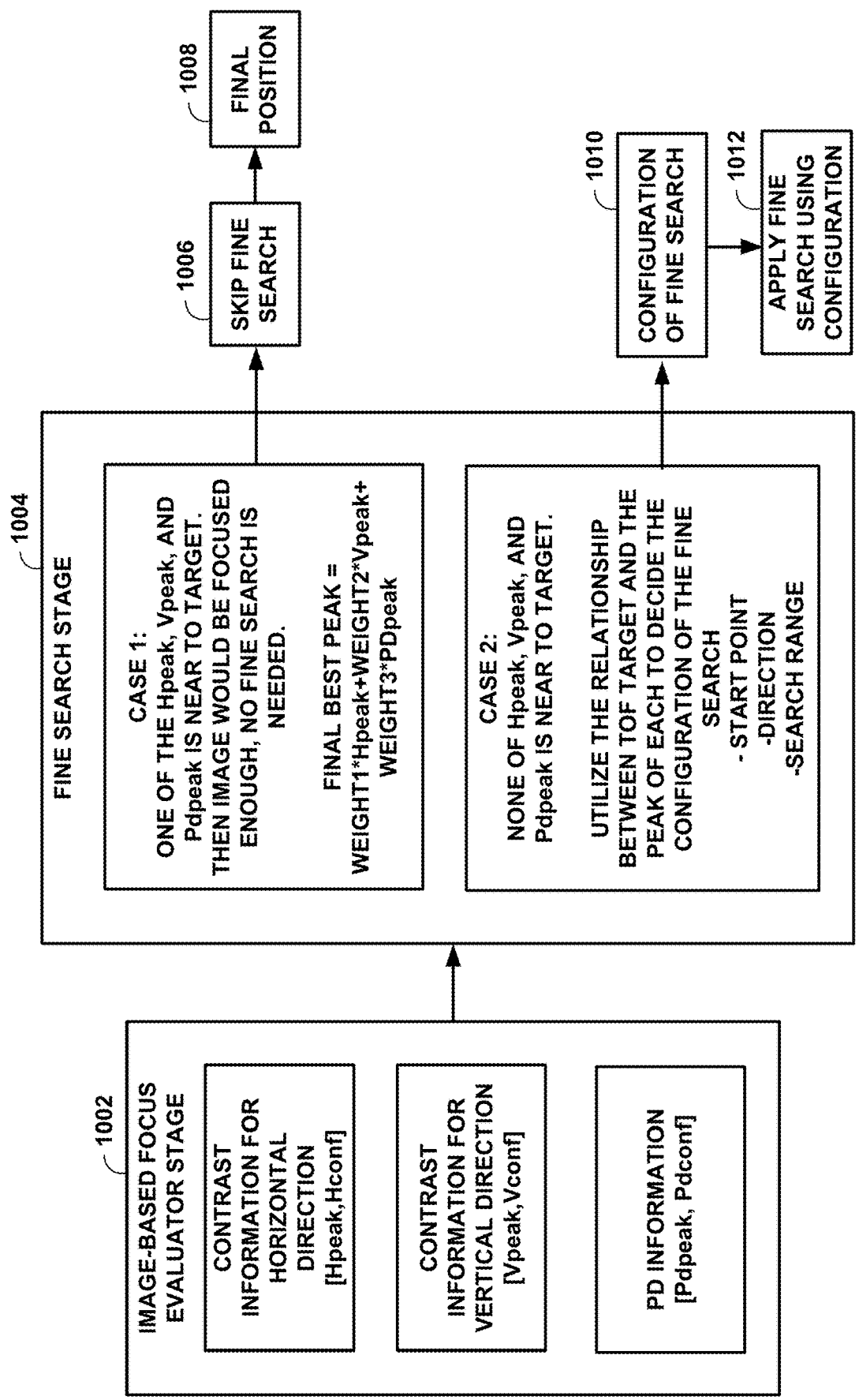
FIG. 10 is a conceptual diagram showing two example cases for an example fine search stage for an active-depth assisted focus with concurrent image-based refinement, in accordance with the techniques of the disclosure.

FIG. 10 is a conceptual diagram showing two example cases for an example fine search stage 1004 for active-depth assisted focus with concurrent image-based refinement, in accordance with the techniques of the disclosure. During image-based focus evaluator stage 1002, image processor 112 may determine contrast information for a horizontal direction. Contrast information for the horizontal direction may include a peak horizontal FV (also referred to herein as simply "Hpeak"). As used herein, Hpeak refers to a focus value (FV) determined using contrast information in a horizontal direction. Hpeak may be also referred to herein as contrast information for a horizontal direction. In some examples, contrast information for the horizontal direction may include a confidence value, which may be referred to herein as simply "Hconf"). A higher Hconf may represent a more trustable Hpeak and a lower Hconf may represent a less trustable Hpeak. Image processor 112 may calculate Hconf based on a sharpness and a curve property of a horizontal ('H') direction focus value curve.

During image-based focus evaluator stage 1002, image processor 112 may determine contrast information for a vertical direction. Contrast information for the vertical direction may include a peak vertical FV (also referred to herein as simply "Vpeak"). As used herein, Vpeak refers to a focus value (FV) determined using contrast information in the vertical direction. Vpeak may be also referred to herein as contrast information for a vertical direction. In some examples, contrast information for the vertical direction may include a confidence value, which may be referred to herein as simply "Vconf"). A higher Vconf value may represent a more trustable Vpeak and a lower Vconf may represent a less trustable Vpeak. Image processor 112 may calculate Vconf based on a sharpness and a curve property of a vertical (V') direction focus value curve.

During image-based focus evaluator stage 1002, image processor 112 determine phase difference information. Phase difference information may include a phase difference peak (also referred to herein as simply "PDpeak"). As used herein, PDpeak may be also referred to herein as phase difference information. In some examples, phase difference information may include a confidence value, which may be referred to herein as simply "PDconf"). A higher PDconf may represent a more trustable PDpeak and a lower PDconf may represent a less trustable PDpeak.

In the first case (Case 1), at least one of Hpeak, Vpeak, or PDpeak is near the active-depth assisted focus target and the property of polynomial curve is qualified. In this example, the image would be sufficiently in-focus and image processor 112 may skip the fine search 1006 and determine the final position 1008. In the first case, techniques described herein may use more image information to cover a various scene, weighting the three peaks as a final best peak. For example, when fine search is skipped, image processor 112 may determine the best peak FV as the combination of Hpeak, Vpeak, and PDpeak with different weighting. The weighing may be determined by the confidence and flexible tuning. That is, image processor 112 may skip fine search and determine the final position for camera lens 122 based on contrast information (e.g., Hpeak, Vpeak) and/or phase difference information (e.g., PD peak). For instance, image processor 112 may determine the final position for a lens of a camera using equation 5.

$$\text{FINAL BEST PEAK} = \text{WEIGHT1}*H_{peak} + \text{WEIGHT2}*V_{peak}\text{WEIGHT3}*PD_{peak} \quad \text{EQUATION 5}$$

where FINAL BEST PEAK is determined FV peak value, WEIGHT1 is a first weight value, WEIGHT2 is a second weight value, and WEIGHT3 is a third weight value. In some examples, one or more of WEIGHT1, WEIGHT2, or WEIGHT3 may be zero. For example, fine search controller 984 may determine the final best peak based on PDpeak (e.g., WEIGHT3 is non-zero) and may set WEIGHT1 and WEIGHT2 to zero.

In a second case (Case 2), none of the Hpeak, Vpeak, and PDpeak is near the TOF target. In this example, image processor 112 may use the relationship between the TOF target and the FV peak of each to determine configuration of a fine search 1010 and apply the fine search using the configuration (1012). For example, image processor 112 may set a start point (e.g., a best confidence peak in the Hpeak, Vpeak, and PDpeak) and a search range (if Hpeak=90 Vpeak=100 PDpeak=120 the search range will cover 90~120). In this way, image processor 112 may perform the fine search with fewer steps compared to systems that do not use the start point.

Image processor 112 may determine the search range using the peak of Hpeak, Vpeak, and PDpeak. For example, image processor 112 may set the search range to at least cover the peak of Hpeak, Vpeak, and PDpeak. For instance, if Hpeak=90 Vpeak=100 PDpeak=120, image processor 112 may determine the search range to at least cover 90~120.

Image processor 112 may determine the direction of a fine search using a current position and a search range. For example, if current lens position is 80 and search range is 90~120, fine search controller 984 may determine the direction to be from 90 to 120 (e.g., in a positive direction). In some examples, if the current lens position is 130 and the search range is 90~120, image processor 112 may determine the direction to be from 90 to 120 (e.g., in a negative or backwards direction).

Figure 11:
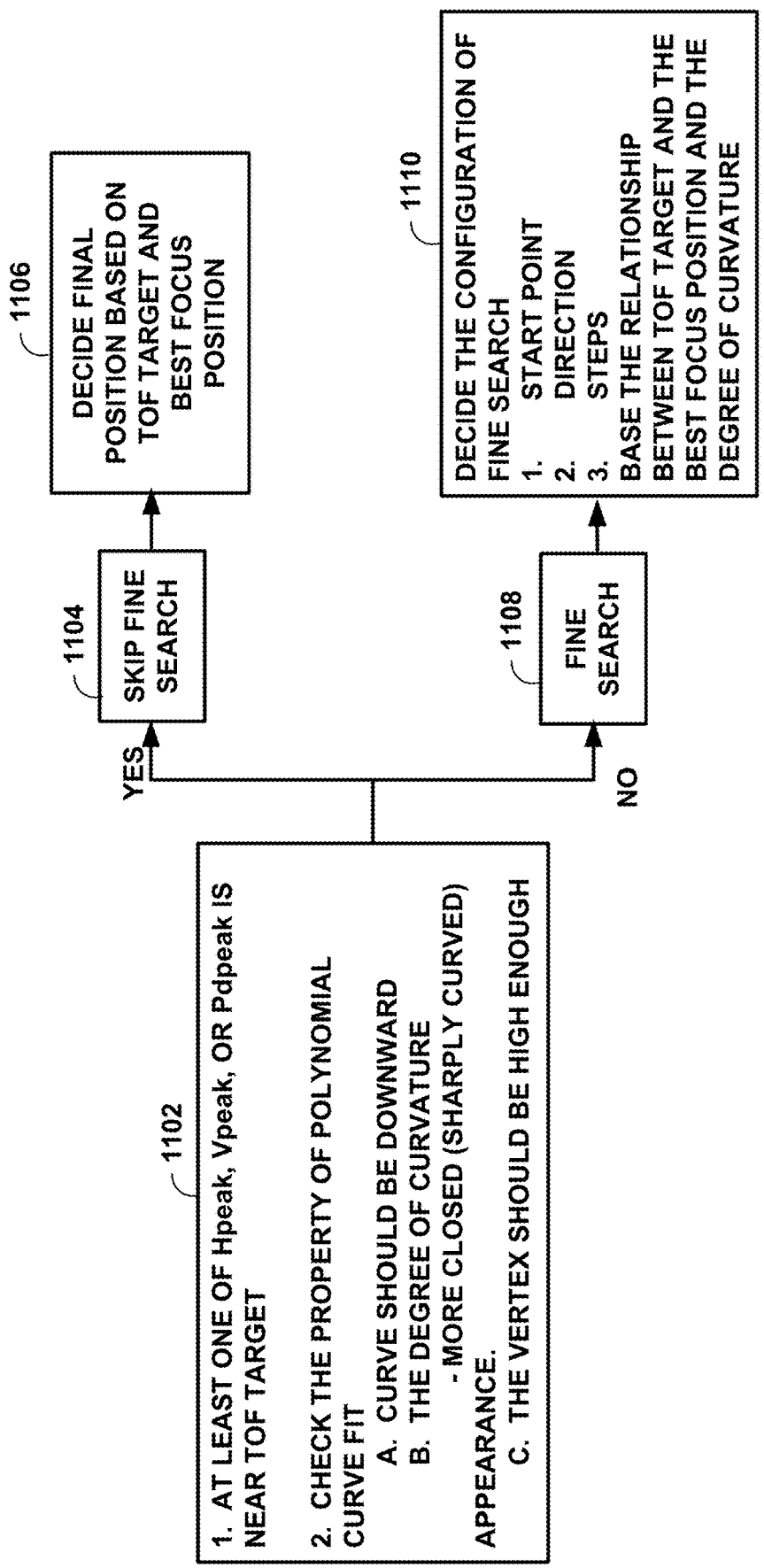
FIG. 11 is a conceptual diagram showing an example process for an active-depth assisted focus with concurrent image-based refinement that decides whether to skip a fine search, in accordance with the techniques of the disclosure.

FIG. 11 is a conceptual diagram showing an example process for active-depth assisted focus with concurrent image-based refinement that decides whether to skip a fine search, in accordance with the techniques of the disclosure. Using the one or more of the Hpeak, Vpeak, or PDpeak, image processor 112 may determine one or more of the following.

1. Whether to skip a fine search
2. A final lens position of the lens
3. The configuration of fine search if the fine search is not skipped.
    the configuration may include a direction, a start point, and a number of steps of the fine search.

For example, image processor 112 may determine a final lens position of camera lens 122 based on a plurality of focus values. For instance, image processor 112 may determine whether the respective focus value for a particular lens position of the plurality of lens positions is within a threshold range from a peak focus value (e.g., Hpeak, Vpeak, or PDpeak) for the distance from the object (1102). In some instances, image processor 112 may determine whether the respective focus value (e.g., Hpeak, Vpeak, or PDpeak) for the particular lens position corresponds to an estimated local maximum of focus values.

In response a determination that the respective focus value for the particular lens position is within the threshold range from the peak focus value for the distance of the object and a determination that the respective focus value for the particular lens position corresponds to the estimated local maximum of focus values, image processor 112 may skip a fine search (1104). In this example, image processor 112 may output instructions to move camera lens 122 to the final lens position without performing the fine search (1106).

However, based on a determination that the respective focus value for the particular lens position is not within the threshold range from the peak focus value for the distance of the object and a determination that the respective focus value for the particular lens position does not correspond to the estimated local maximum of focus values, image processor 112 may perform the fine search based on the plurality of focus values (1108).

Image processor 112 may decide a configuration for the fine search (1110). For example, image processor 112 may determine a start point for the fine search based on the plurality of lens position and the plurality of focus values. In some examples, image processor 112 may determine a direction for the fine search based on the plurality of lens position and the plurality of focus values. In some examples, image processor 112 may determine a search range for the fine search based on the plurality of lens position and the plurality of focus values. Image processor 112 may perform the fine search to determine the final lens position of camera lens 122 and output instructions to move camera lens 122 to the final lens position determined using the fine search.

With the active-depth assisted focus techniques described herein using active-depth assisted focus with concurrent image-based refinement, a user experience relating to a photography of people may be improved and an accuracy of the resulting image even on very low light condition may be improved compared to systems using CDAF, active-depth assisted focus with a fine search, and PDAF.

FIG. 12 is a conceptual diagram of an example phase detection auto focus (PDAF) sensor. Image processor 112 may, using the process of FIG. 12, generate phase difference information from images acquired at the same time as the ToF measurements, which may be used by image processor 112 to perform image-based focus refinement using the phase difference information. In the example of FIG. 12, camera 102 includes a PDAF sensor array 70. PDAF sensor array 70 may generate phase difference information from images acquired at the same time as the ToF measurements, which may be used by device 100 to perform image-based focus refinement using the phase difference information. Image sensor 124 may include PDAF sensor array 70.

PDAF sensor array 70 shows an 8×8 portion of an example sensor array for purposes of illustration. Some sensor arrays may include millions of pixels. Each pixel in PDAF sensor array 70 may be divided into a left and right pixel, as shown by the dashed line. In addition, each pixel in PDAF sensor array is associated with a color filter. The pattern of the color filters shown in FIG. 12 is a called a Bayer filter. A Bayer filter is a color filter array for Red (R), Blue (B), and Green (G) filters arranged on the pixels (e.g., photodiodes or photosensors) of PDAF sensor array 70.

The Bayer filter results in each pixel only capturing one color value for each pixel. Image processor 112 may produce a full-color image by performing a demosaicing algorithm to interpolate a complete RGB value for each pixel. Demosaicing algorithms use the various color values of surrounding pixels to produce a full color value for a particular pixel.

FIG. 12 also shows an enlarged view of a single pixel 72. Pixel 72, like the other pixels in PDAF sensor array 70, is configured as a phase detection pixel. In this example, pixel 72 is configured as a dual photodiode. However, the phase detection pixels of sensor array 70 may be configured in any manner to receive and output phase difference pixel values.

Pixel 72 may include a mask 82 that divides the photodiodes of pixel 72 into a left photodiode 78 and a right photodiode 80. Pixel 72 need not be limited to photodiodes, but may use any type of photosensors that may be configured to receive light and output an electrical signal indicating the amount of light received. Pixel 72 may further include a green color filter 76 and an on-chip lens 74. Of course, given the position of pixel 72 in the Bayer filter mask of PDAF sensor array 70, the color filter may be a different color (e.g., red or blue).

Light passes through on-chip lens 74 and then through green color filter 76. The intensity of the green light that is then incident on left photodiode 78 and right photodiode 78 is then converted into an electrical signal. The electrical signal may then be converted to a digital value (e.g., using an analog-to-digital converter). Note that on-chip lens 74 is not the same as the main lens of camera 102. On-chip lens 74 is a fixed lens associated with pixel 72 of PDAF sensor array 70, while the main lens is the adjustable lens that is part of the entire package of camera 102.

FIG. 13 is a conceptual diagram showing one example technique for determining phase difference pixel data in a PDAF sensor. In the example FIG. 12, camera 102 is a type 2 PDAF sensor (labeled as camera 102A). PDAF sensor array 70 may generate phase difference information from images acquired at the same time as the ToF measurements, which may be used by device 100 to perform image-based focus refinement using the phase difference information. Type2 PDAF sensors (e.g., camera 102A) are a commonly used sensor type. Examples include the SS2P7 sensor made by Samsung Electronics of Yeongtown, South Korea, and the IMX362 sensor made by the Sony Corporation of Tokyo, Japan.

As described above, in a type2 PDAF sensor, the separation and phase difference correction on the pixel data stream may be performed inside the sensor. After separation and correction, the pixel data received by camera 102A may be averaged and the pixel data is transferred to image processor 112. For example, image processor 112 may be configured to average both the value of the right photodiode (Rp) and the left photodiode (Lp) to form a complete pixel, which is transferred to image processor 112 with a unique data type. The data type may indicate to image processor 112 that the data is pixel data that is to be used to process and receive an image (e.g., that the data is not to be used for auto focus determination).

In a type2 PDAF sensor, the phase calculation process may be performed by image processor 112. In some examples, a processor at camera 102 may be configured to send an entire stream of phase difference pixel data (e.g., phase difference values for every phase detection pixel in the array of camera 102A) to image processor 112. Image processor 112 may perform the phase difference calculation to obtain the defocus values and translate them into a lens position. Image processor 112 may calculate the phase difference pixel data using interpolation of the values of neighbor phase detection pixels.

FIG. 13 shows one example of how to calculate phase difference values for a particular phase detection pixel. Image processor 112 may calculate the phase difference pixel data for both the left photodiode (designated $Y_L$) and the right photodiode (designated $Y_R$). Image processor 112 may generate phase difference information from images acquired at the same time as the ToF measurements, which may be used to perform image-based focus refinement using the phase difference information.

For example, for pixel 84, image processor 112 may use the surrounding pixel data values in region 86 to interpolate the phase difference values. Image processor 112 may interpolate the phase difference value for the left photodiode of pixel 84 ($Y_L$) and the right photodiode of pixel 84 ($Y_R$) as follows:

$$Y_L = a*R_L + b*G_L + c*B_L \qquad \text{EQUATION 6}$$

$$Y_R = a'*R_R + b'*G_R + c'*B_R \qquad \text{EQUATION 7}$$

Image processor 112 may determine the values of $R_L$, $R_R$, $G_L$, $G_R$, $B_L$, and $B_R$ from the photo detection pixels of region 86. The values of constants a, a', b, b', c, and c' may be the same as those used in RGB to YUV or YCrCb color space conversions. However, the values of the constants may be changed based on user preferences. Example default values may be a=0.299, b=0.587, and c=0.114. FIG. 13 shows one example of how image processor 112 may be configured to calculate phase difference values. However, other techniques may be used.

Figure 14:
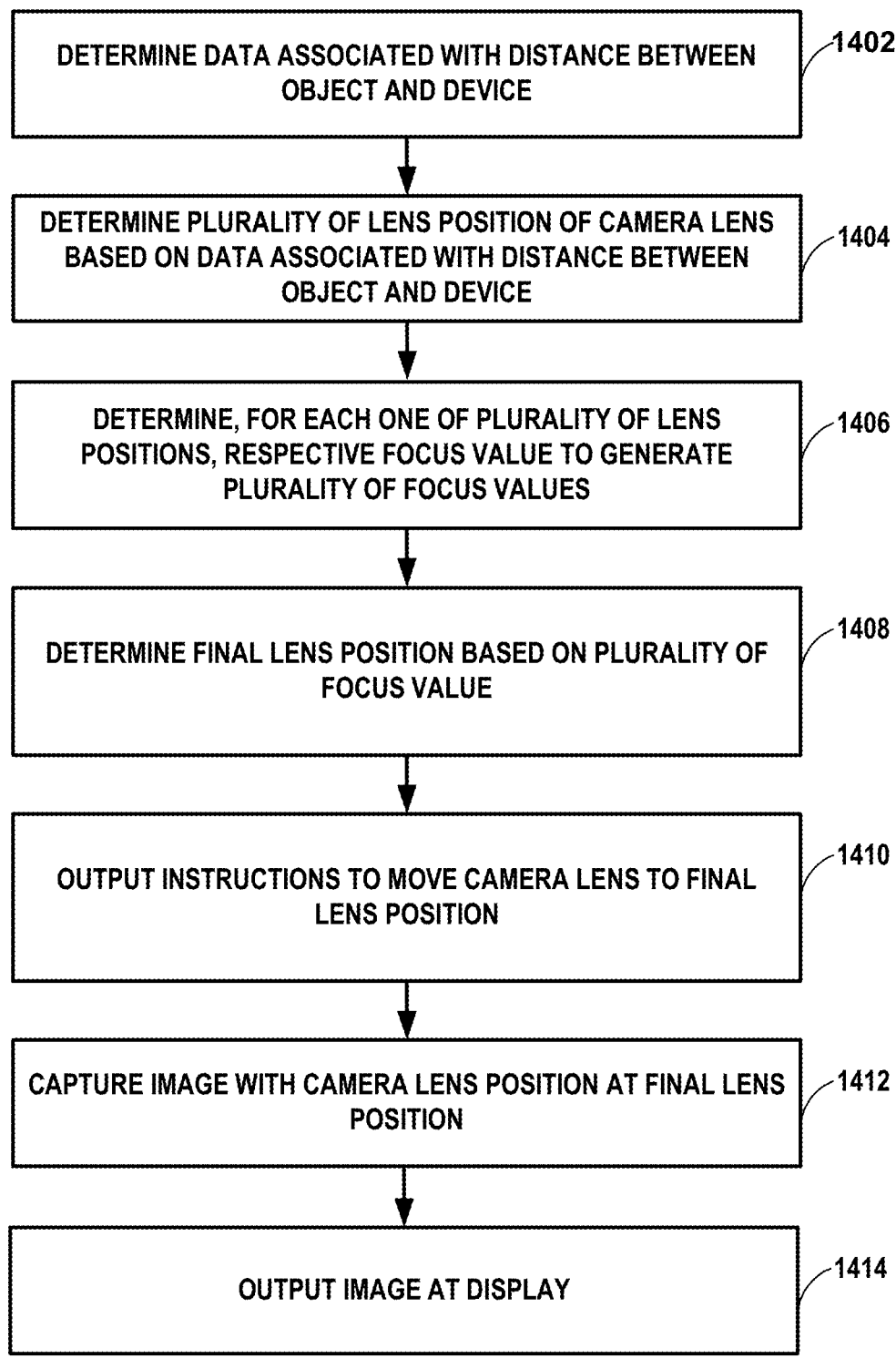
FIG. 14 is a flowchart illustrating an example method of operation according to one or more example techniques described in this disclosure.

FIG. 14 is a flowchart illustrating an example method of operation according to one or more example techniques described in this disclosure. FIG. 14 is described using image processor 112 of FIG. 1 for example purposes only. Image processor 112 may determine data associated with a distance between object 126 and device 100 (1402). For example, image processor 112 may apply a process for laser autofocus and/or time-of-flight to determine the data associated with the distance between object 126 and device 100. Image processor 112 may determine a plurality of lens positions of camera lens 122 based on the data associated with the distance between object 126 and device 100 (1404). For example, image processor 112 may determine lens positions 902A-902D of FIG. 9A based on the distance of image sensor 124 from object 126. Image processor 112 may cause camera lens 122 to move to each of the plurality of lens positions in response to determining the plurality of lens positions.

Image processor 112 may determine, for each one of the plurality of lens positions, a respective focus value to generate a plurality of focus values (1406). To determine, for each one of the plurality of lens positions, the respective focus value, image processor 112 may determine, for each one of the plurality of lens positions, phase difference information. For example, image processor 112 may determine a focus value for each one of lens positions 902A-902D of FIG. 9A using a phase difference. Determining a focus value for each one of a plurality of lens positions using a phase difference may improve an accuracy of the focus values compared to systems relying only on CDAF. Improving an accuracy of the focus values may increase a speed of AF, which may improve a user experience relating to a photography compared to systems using CDAF, active-depth assisted focus with a fine search, and PDAF.

Image processor 112 may determine a final lens position based on the plurality of focus values (1408). For example, image processor 112 may determine whether the respective focus value for a particular lens position of a plurality of lens positions (e.g., lens positions 902A-902D) is within a threshold range from a peak focus value for the data associated with the distance between object 126 and device 100. In some examples, image processor 112 may determine whether the respective focus value for the particular lens position corresponds to an estimated local maximum of focus values.

Image processor 112 may, in response to a determination that the respective focus value for the particular lens position of camera lens 122 is within the threshold range from the peak focus value for the distance of the object and a determination that the respective focus value for the particular lens position of camera lens 122 corresponds to the estimated local maximum of focus values, skip a fine search. In this example, image processor 112 may select a lens position from the plurality of lens positions with a highest focus value. Skipping a fine search may increase a speed of AF, which may improve a user experience relating to a photography compared to systems using CDAF, active-depth assisted focus with a fine search, and PDAF.

In some examples, image processor 112 may be configured to perform a fine search based on a determination that the respective focus value for the particular lens position is not within the threshold range from the peak focus value for the distance of the object and a determination that the respective focus value for the particular lens position does not correspond to the estimated local maximum of focus values. For example, image processor 112 may determine a start point for the fine search based on the plurality of lens position and the plurality of focus values. In some examples, image processor 112 may determine a direction for the fine search based on the plurality of lens position and the plurality of focus values. In some examples, image processor 112 may determine a search range for the fine search based on the plurality of lens position and the plurality of focus values.

Image processor 112 may perform a fine search using one or more of the start point, direction, or search range. Performing a fine search using one or more of the start point, direction, or search range may improve a speed of AF, which may improve a user experience relating to a photography compared to systems using CDAF, active-depth assisted focus with a fine search, and PDAF.

Image processor 112 may output instructions to move the camera lens to the final lens position (1410). Image processor 112 may position, with camera 102, camera lens 122 to the final lens position. Camera 102 may capture an image with the camera lens positioned to the final lens position (1412). One or more processors 110 may output the image at display 114 (1414).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The following clauses are a non-limiting list of clauses in accordance with one or more techniques of this disclosure.

Clause A1. An apparatus configured for image processing, the apparatus comprising a processor configured to: determine a distance from an object; determine a plurality of lens positions of a camera lens based on the distance from the object; determine, for each one of the plurality of lens positions, a respective focus value to generate a plurality of focus values, wherein, to determine, for each one of the plurality of lens positions, the respective focus value, the processor is configured to determine, for each one of the plurality of lens positions, phase difference information; and determine a final lens position based on the plurality of focus values.

Clause A2. The apparatus of clause A1, wherein the processor is further configured to output instructions to move the camera lens to the final lens position.

Clause A3. The apparatus of one or more of clauses A1-A2, wherein, to determine, for each one of the plurality of lens positions, the respective focus value, the processor is further configured to determine, for each one of the plurality of lens positions, one or more of: contrast information for a horizontal direction; or contrast information for a vertical direction.

Clause A4. The apparatus of one or more of clauses A1-A3, wherein, to determine the final lens position, the processor is configured to: determine whether the respective focus value for a particular lens position of the plurality of lens positions is within a threshold distance from a peak focus value for the distance from the object; and/or determine whether the respective focus value for the particular lens position corresponds to a local maximum of focus values.

Clause A5. The apparatus of clause A4, wherein, to determine the final lens position, the processor is configured to, in response to a determination that the respective focus value for the particular lens position is within the threshold distance from the peak focus value for the distance of the object and a determination that the respective focus value for the particular lens position corresponds to the local maximum of focus values, skip a fine search.

Clause A6. The apparatus of clause A4, wherein, to determine the final lens position, the processor is configured to perform a fine search based on the plurality of focus values based on a determination that the respective focus value for the particular lens position is not within the threshold distance from the peak focus value for the distance of the object and a determination that the respective focus value for the particular lens position does not correspond to the local maximum of focus values.

Clause A7. The apparatus of clause A6, wherein, to determine the final lens position, the processor is configured to: determine a start point for the fine search based on the plurality of lens position and the plurality of focus values; determine a direction for the fine search based on the plurality of lens position and the plurality of focus values; and/or determine a search range for the fine search based on the plurality of lens position and the plurality of focus values.

Clause A8. The apparatus of one or more of clauses A1-A7, wherein, to determine the distance of the object, the processor is configured to perform an active-depth assisted focus operation.

Clause B1. An apparatus configured for image processing, the apparatus comprising one or more processors implemented in circuitry and configured to: determine data associated with a distance between an object and the apparatus; determine a plurality of lens positions of a camera lens based on the data associated with the distance between the object and the apparatus; determine, for each one of the plurality of lens positions, a respective focus value to generate a plurality of focus values, wherein, to determine, for each one of the plurality of lens positions, the respective focus value, the one or more processors are configured to determine, for each one of the plurality of lens positions, phase difference information; and determine a final lens position based on the plurality of focus values.

Clause B2. The apparatus of clause B1, wherein the one or more processors are further configured to output instructions to move the camera lens to the final lens position.

Clause B3. The apparatus of clause B1, wherein, to determine, for each one of the plurality of lens positions, the respective focus value, the one or more processors are further configured to determine, for each one of the plurality of lens positions, one or more of: contrast information for a horizontal direction; or contrast information for a vertical direction.

Clause B4. The apparatus of clause B1, wherein, to determine the final lens position, the one or more processors are configured to: determine whether the respective focus value for a particular lens position of the plurality of lens positions is within a threshold range from a peak focus value for the data associated with the distance between the object and the apparatus; and determine whether the respective focus value for the particular lens position corresponds to an estimated local maximum of focus values.

Clause B5. The apparatus of clause B4, wherein, to determine the final lens position, the one or more processors are configured to skip a fine search in response to a determination that the respective focus value for the particular lens position is within the threshold range from the peak focus value for the distance of the object and a determination that the respective focus value for the particular lens position corresponds to the estimated local maximum of focus values.

Clause B6. The apparatus of clause B4, wherein, to determine the final lens position, the one or more processors are configured to perform a fine search based on the plurality of focus values based on a determination that the respective focus value for the particular lens position is not within the threshold range from the peak focus value for the distance of the object and a determination that the respective focus value for the particular lens position does not correspond to the estimated local maximum of focus values.

Clause B7. The apparatus of clause B6, wherein, to determine the final lens position, the one or more processors are configured to: determine a start point for the fine search based on the plurality of lens position and the plurality of focus values; determine a direction for the fine search based on the plurality of lens position and the plurality of focus values; or determine a search range for the fine search based on the plurality of lens position and the plurality of focus values.

Clause B8. The apparatus of clause B1, wherein, to determine the distance of the object, the one or more processors are configured to perform an active-depth assisted focus operation.

Clause B9. The apparatus of clause B1, wherein, to determine the distance of the object, the one or more processors are configured to perform a course search.

Clause B10. The apparatus of clause B1, wherein, to determine the distance of the object, the one or more processors are configured to perform phase detection auto focus (PDAF).

Clause B11. The apparatus of clause B1, further comprising a camera configured to: position the camera lens to the final lens position; and capture an image with the camera lens positioned at the final lens position.

Clause B12. The apparatus of clause B11, further comprising a display configured to output the image.

Clause B13. The apparatus of clause B1, wherein the one or more processors are configured to cause the camera lens to move to each of the plurality of lens positions in response to determining the plurality of lens positions.

Clause B14. A method for image processing, the method comprising: determining, with one or more processors implemented in circuitry, data associated with a distance between an object and a camera lens; determining, with the one or more processors, a plurality of lens positions of the camera lens based on the data associated with the distance between the object and the camera lens; determining, with the one or more processors and for each one of the plurality of lens positions, a respective focus value to generate a plurality of focus values, wherein determining, for each one of the plurality of lens positions, the respective focus value comprises determining, for each one of the plurality of lens positions, phase difference information; and determining, with the one or more processors, a final lens position based on the plurality of focus values.

Clause B15. The method of clause B14, further comprising outputting, with the one or more processors, instructions to move the camera lens to the final lens position.

Clause B16. The method of clause B14, wherein determining, for each one of the plurality of lens positions, the respective focus value, comprises determining, for each one of the plurality of lens positions, one or more of: contrast information for a horizontal direction; or contrast information for a vertical direction.

Clause B17. The method of clause B14, wherein determining the final lens position comprises: determining whether the respective focus value for a particular lens position of the plurality of lens positions is within a threshold range from a peak focus value for the data associated with the distance between the object and the camera lens; and determining whether the respective focus value for the particular lens position corresponds to an estimated local maximum of focus values.

Clause B18. The method of clause B17, wherein determining the final lens position comprises skipping a fine search in response to a determination that the respective focus value for the particular lens position is within the threshold range from the peak focus value for the distance of the object and a determination that the respective focus value for the particular lens position corresponds to the estimated local maximum of focus values.

Clause B19. The method of clause B17, wherein determining the final lens position comprises performing a fine search based on the plurality of focus values based on a determination that the respective focus value for the particular lens position is not within the threshold range from the peak focus value for the distance of the object and a determination that the respective focus value for the particular lens position does not correspond to the estimated local maximum of focus values.

Clause B20. The method of clause B19, wherein determining the final lens position comprises: determining a start point for the fine search based on the plurality of lens position and the plurality of focus values; determining a direction for the fine search based on the plurality of lens position and the plurality of focus values; or determining a search range for the fine search based on the plurality of lens position and the plurality of focus values.

Clause B21. The method of clause B14, wherein determining the distance of the object comprises performing an active-depth assisted focus operation.

Clause B22. The method of clause B14, wherein determining the distance of the object comprises performing a course search.

Clause B23. The method of clause B14, wherein determining the distance of the object comprises performing phase detection auto focus (PDAF).

Clause B24. The method of clause B14, further comprising: positioning, with the one or more processors and with a camera, the camera lens to the final lens position; and capturing, with the one or more processors and with the camera, an image with the camera lens positioned at the final lens position.

Clause B25. The method of clause B24, further comprising outputting, with the one or more processors, the image at a display.

Clause B26. The method of clause B14, further comprising causing, with the one or more processors, the camera lens to move to each of the plurality of lens positions in response to determining the plurality of lens positions.

Clause B27. A device for image processing, the device comprising: means for determining data associated with a distance between an object and the device; means for determining a plurality of lens positions of a camera lens based on the data associated with the distance between the object and the device; means for determining, for each one of the plurality of lens positions, a respective focus value to generate a plurality of focus values, wherein the means for determining, for each one of the plurality of lens positions, the respective focus value comprises means for determining, for each one of the plurality of lens positions, phase difference information; and means for determining a final lens position based on the plurality of focus values.

Clause B28. A computer-readable storage medium having stored thereon instructions that, when executed, configure one or more processors to: determine data associated with a distance between an object and a camera lens; determine a plurality of lens positions of the camera lens based on the data associated with the distance between the object and the camera lens; determine, for each one of the plurality of lens positions, a respective focus value to generate a plurality of focus values, wherein the instructions that cause the one or more processors to determine, for each one of the plurality of lens positions, the respective focus value further cause the processor to determine, for each one of the plurality of lens positions, phase difference information; and determine a final lens position based on the plurality of focus values.

Clause C1. An apparatus configured for image processing, the apparatus comprising one or more processors implemented in circuitry and configured to: determine data associated with a distance between an object and the apparatus; determine a plurality of lens positions of a camera lens based on the data associated with the distance between the object and the apparatus; determine, for each one of the plurality of lens positions, a respective focus value to generate a plurality of focus values, wherein, to determine, for each one of the plurality of lens positions, the respective focus value, the one or more processors are configured to determine, for each one of the plurality of lens positions, phase difference information; and determine a final lens position based on the plurality of focus values.

Clause C2. The apparatus of clause C1, wherein the one or more processors are further configured to output instructions to move the camera lens to the final lens position.

Clause C3. The apparatus of any combination of clauses C1-C2, wherein, to determine, for each one of the plurality of lens positions, the respective focus value, the one or more processors are further configured to determine, for each one of the plurality of lens positions, one or more of: contrast information for a horizontal direction; or contrast information for a vertical direction.

Clause C4. The apparatus of any combination of clauses C1-C3, wherein, to determine the final lens position, the one or more processors are configured to: determine whether the respective focus value for a particular lens position of the plurality of lens positions is within a threshold range from a peak focus value for the data associated with the distance between the object and the apparatus; and determine whether the respective focus value for the particular lens position corresponds to an estimated local maximum of focus values.

Clause C5. The apparatus of clause C4, wherein, to determine the final lens position, the one or more processors are configured to skip a fine search in response to a determination that the respective focus value for the particular lens position is within the threshold range from the peak focus value for the distance of the object and a determination that the respective focus value for the particular lens position corresponds to the estimated local maximum of focus values.

Clause C6. The apparatus of clause C4, wherein, to determine the final lens position, the one or more processors are configured to perform a fine search based on the plurality of focus values based on a determination that the respective focus value for the particular lens position is not within the threshold range from the peak focus value for the distance of the object and a determination that the respective focus value for the particular lens position does not correspond to the estimated local maximum of focus values.

Clause C7. The apparatus of clause C6, wherein, to determine the final lens position, the one or more processors are configured to: determine a start point for the fine search based on the plurality of lens position and the plurality of focus values; determine a direction for the fine search based on the plurality of lens position and the plurality of focus values; or determine a search range for the fine search based on the plurality of lens position and the plurality of focus values.

Clause C8. The apparatus of any combination of clauses C1-C7, wherein, to determine the distance of the object, the one or more processors are configured to perform an active-depth assisted focus operation.

Clause C9. The apparatus of any combination of clauses C1-C8, wherein, to determine the distance of the object, the one or more processors are configured to perform a course search.

Clause C10. The apparatus of any combination of clauses C1-C8, wherein, to determine the distance of the object, the one or more processors are configured to perform phase detection auto focus (PDAF).

Clause C11. The apparatus of any combination of clauses C1-C10, further comprising a camera configured to: position the camera lens to the final lens position; and capture an image with the camera lens positioned at the final lens position.

Clause C12. The apparatus of clause C11, further comprising a display configured to output the image.

Clause C13. The apparatus of any combination of clauses C1-C12, wherein the one or more processors are configured to cause the camera lens to move to each of the plurality of lens positions in response to determining the plurality of lens positions.

Clause C14. A method for image processing, the method comprising: determining, with one or more processors implemented in circuitry, data associated with a distance between an object and a camera lens; determining, with the one or more processors, a plurality of lens positions of the camera lens based on the data associated with the distance between the object and the camera lens; determining, with the one or more processors and for each one of the plurality of lens positions, a respective focus value to generate a plurality of focus values, wherein determining, for each one of the plurality of lens positions, the respective focus value comprises determining, for each one of the plurality of lens positions, phase difference information; and determining, with the one or more processors, a final lens position based on the plurality of focus values.

Clause C15. The method of clause C14, further comprising outputting, with the one or more processors, instructions to move the camera lens to the final lens position.

Clause C16. The method of any combination of clauses C14-C15, wherein determining, for each one of the plurality of lens positions, the respective focus value, comprises determining, for each one of the plurality of lens positions, one or more of: contrast information for a horizontal direction; or contrast information for a vertical direction.

Clause C17. The method of any combination of clauses C14-C16, wherein determining the final lens position comprises: determining whether the respective focus value for a particular lens position of the plurality of lens positions is within a threshold range from a peak focus value for the data associated with the distance between the object and the camera lens; and determining whether the respective focus value for the particular lens position corresponds to an estimated local maximum of focus values.

Clause C18. The method of clause C17, wherein determining the final lens position comprises skipping a fine search in response to a determination that the respective focus value for the particular lens position is within the threshold range from the peak focus value for the distance of the object and a determination that the respective focus value for the particular lens position corresponds to the estimated local maximum of focus values.

Clause C19. The method of clause C17, wherein determining the final lens position comprises performing a fine search based on the plurality of focus values based on a determination that the respective focus value for the particular lens position is not within the threshold range from the peak focus value for the distance of the object and a determination that the respective focus value for the particular lens position does not correspond to the estimated local maximum of focus values.

Clause C20. The method of clause C19, wherein determining the final lens position comprises: determining a start point for the fine search based on the plurality of lens position and the plurality of focus values; determining a direction for the fine search based on the plurality of lens position and the plurality of focus values; or determining a search range for the fine search based on the plurality of lens position and the plurality of focus values.

Clause C21. The method of any combination of clauses C14-C20, wherein determining the distance of the object comprises performing an active-depth assisted focus operation.

Clause C22. The method of any combination of clauses C14-C21, wherein determining the distance of the object comprises performing a course search.

Clause C23. The method of any combination of clauses C14-C22, wherein determining the distance of the object comprises performing phase detection auto focus (PDAF).

Clause C24. The method of any combination of clauses C14-C23, further comprising: positioning, with the one or more processors and with a camera, the camera lens to the final lens position; and capturing, with the one or more processors and with the camera, an image with the camera lens positioned at the final lens position.

Clause C25. The method of clause C24, further comprising outputting, with the one or more processors, the image at a display.

Clause C26. The method of any combination of clauses C14-C25, further comprising causing, with the one or more processors, the camera lens to move to each of the plurality of lens positions in response to determining the plurality of lens positions.

Clause C27. A device for image processing, the device comprising: means for determining data associated with a distance between an object and the device; means for determining a plurality of lens positions of a camera lens based on the data associated with the distance between the object and the device; means for determining, for each one of the plurality of lens positions, a respective focus value to generate a plurality of focus values, wherein the means for determining, for each one of the plurality of lens positions, the respective focus value comprises means for determining, for each one of the plurality of lens positions, phase difference information; and means for determining a final lens position based on the plurality of focus values.

Clause C28. A computer-readable storage medium having stored thereon instructions that, when executed, configure one or more processors to: determine data associated with a distance between an object and a camera lens; determine a plurality of lens positions of the camera lens based on the data associated with the distance between the object and the camera lens; determine, for each one of the plurality of lens positions, a respective focus value to generate a plurality of focus values, wherein the instructions that cause the one or more processors to determine, for each one of the plurality of lens positions, the respective focus value further cause the processor to determine, for each one of the plurality of lens positions, phase difference information; and determine a final lens position based on the plurality of focus values.

Various examples have been described. These and other examples are within the scope of the following claims.

What is claimed is:

1. An apparatus configured for image processing, the apparatus comprising one or more processors implemented in circuitry and configured to:
    determine data associated with a distance between an object and the apparatus;
    determine a plurality of lens positions of a camera lens based on the data associated with the distance between the object and the apparatus;
    determine, for each one of the plurality of lens positions, a respective focus value to generate a plurality of focus values, wherein, to determine, for each one of the plurality of lens positions, the respective focus value, the one or more processors are configured to determine, for each one of the plurality of lens positions, phase difference information; and
    determine a final lens position based on the plurality of focus values, wherein, to determine the final lens position, the one or more processors are configured to determine whether the respective focus value for a particular lens position of the plurality of lens positions is within a threshold range from a peak focus value for the data associated with the distance between the object and the apparatus.

2. The apparatus of claim 1, wherein the one or more processors are further configured to output instructions to move the camera lens to the final lens position.

3. The apparatus of claim 1, wherein, to determine, for each one of the plurality of lens positions, the respective focus value, the one or more processors are further configured to determine, for each one of the plurality of lens positions, one or more of:
    contrast information for a horizontal direction; or
    contrast information for a vertical direction.

4. The apparatus of claim 1, wherein, to determine the final lens position, the one or more processors are further configured to:
    determine whether the respective focus value for the particular lens position corresponds to an estimated local maximum of focus values.

5. The apparatus of claim 4, wherein, to determine the final lens position, the one or more processors are configured to skip a fine search in response to a determination that the respective focus value for the particular lens position is within the threshold range from the peak focus value for the distance of the object and a determination that the respective focus value for the particular lens position corresponds to the estimated local maximum of focus values.

6. The apparatus of claim 4, wherein, to determine the final lens position, the one or more processors are configured to perform a fine search based on the plurality of focus values based on a determination that the respective focus value for the particular lens position is not within the threshold range from the peak focus value for the distance of the object and a determination that the respective focus value for the particular lens position does not correspond to the estimated local maximum of focus values.

7. The apparatus of claim 6, wherein, to determine the final lens position, the one or more processors are configured to:
   determine a start point for the fine search based on the plurality of lens position and the plurality of focus values;
   determine a direction for the fine search based on the plurality of lens position and the plurality of focus values; or
   determine a search range for the fine search based on the plurality of lens position and the plurality of focus values.

8. The apparatus of claim 1, wherein, to determine the distance of the object, the one or more processors are configured to perform an active-depth assisted focus operation.

9. The apparatus of claim 1, wherein, to determine the distance of the object, the one or more processors are configured to perform a course search.

10. The apparatus of claim 1, wherein, to determine the distance of the object, the one or more processors are configured to perform phase detection auto focus (PDAF).

11. The apparatus of claim 1, further comprising a camera configured to:
    position the camera lens to the final lens position; and
    capture an image with the camera lens positioned at the final lens position.

12. The apparatus of claim 11, further comprising a display configured to output the image.

13. The apparatus of claim 1, wherein the one or more processors are configured to cause the camera lens to move to each of the plurality of lens positions in response to determining the plurality of lens positions.

14. A method for image processing, the method comprising:
    determining, with one or more processors implemented in circuitry, data associated with a distance between an object and a camera lens;
    determining, with the one or more processors, a plurality of lens positions of the camera lens based on the data associated with the distance between the object and the camera lens;
    determining, with the one or more processors and for each one of the plurality of lens positions, a respective focus value to generate a plurality of focus values, wherein determining, for each one of the plurality of lens positions, the respective focus value comprises determining, for each one of the plurality of lens positions, phase difference information; and
    determining, with the one or more processors, a final lens position based on the plurality of focus values, wherein determining the final lens position comprises determining whether the respective focus value for a particular lens position of the plurality of lens positions is within a threshold range from a peak focus value for the data associated with the distance between the object and the camera lens.

15. The method of claim 14, further comprising outputting, with the one or more processors, instructions to move the camera lens to the final lens position.

16. The method of claim 14, wherein determining, for each one of the plurality of lens positions, the respective focus value, comprises determining, for each one of the plurality of lens positions, one or more of:
    contrast information for a horizontal direction; or
    contrast information for a vertical direction.

17. The method of claim 14, wherein determining the final lens position further comprises:
    determining whether the respective focus value for the particular lens position corresponds to an estimated local maximum of focus values.

18. The method of claim 17, wherein determining the final lens position comprises skipping a fine search in response to a determination that the respective focus value for the particular lens position is within the threshold range from the peak focus value for the distance of the object and a determination that the respective focus value for the particular lens position corresponds to the estimated local maximum of focus values.

19. The method of claim 17, wherein determining the final lens position comprises performing a fine search based on the plurality of focus values based on a determination that the respective focus value for the particular lens position is not within the threshold range from the peak focus value for the distance of the object and a determination that the respective focus value for the particular lens position does not correspond to the estimated local maximum of focus values.

20. The method of claim 19, wherein determining the final lens position comprises:
    determining a start point for the fine search based on the plurality of lens position and the plurality of focus values;
    determining a direction for the fine search based on the plurality of lens position and the plurality of focus values; or
    determining a search range for the fine search based on the plurality of lens position and the plurality of focus values.

21. The method of claim 14, wherein determining the distance of the object comprises performing an active-depth assisted focus operation.

22. The method of claim 14, wherein determining the distance of the object comprises performing a course search.

23. The method of claim 14, wherein determining the distance of the object comprises performing phase detection auto focus (PDAF).

24. The method of claim 14, further comprising:
    positioning, with the one or more processors and with a camera, the camera lens to the final lens position; and
    capturing, with the one or more processors and with the camera, an image with the camera lens positioned at the final lens position.

25. The method of claim 24, further comprising outputting, with the one or more processors, the image at a display.

26. The method of claim 14, further comprising causing, with the one or more processors, the camera lens to move to each of the plurality of lens positions in response to determining the plurality of lens positions.

27. A non-transitory computer-readable storage medium having stored thereon instructions that, when executed, configure one or more processors to:
    determine data associated with a distance between an object and a camera lens;

determine a plurality of lens positions of the camera lens based on the data associated with the distance between the object and the camera lens;

determine, for each one of the plurality of lens positions, a respective focus value to generate a plurality of focus values, wherein the instructions that cause the one or more processors to determine, for each one of the plurality of lens positions, the respective focus value further cause the processor to determine, for each one of the plurality of lens positions, phase difference information; and determine a final lens position based on the plurality of focus values, wherein, to determine the final lens position, the instructions further configure the one or more processors to determine whether the respective focus value for a particular lens position of the plurality of lens positions is within a threshold range from a peak focus value for the data associated with the distance between the object and the camera lens.

\* \* \* \* \*